United States Patent
Keledjian et al.

(10) Patent No.: US 9,328,274 B2
(45) Date of Patent: May 3, 2016

(54) MICHAEL ACCEPTOR-TERMINATED URETHANE-CONTAINING FUEL RESISTANT PREPOLYMERS AND COMPOSITIONS THEREOF

(71) Applicant: PRC-DeSoto International, Inc., Sylmar, CA (US)

(72) Inventors: Raquel Keledjian, Glendale, CA (US); Marfi Ito, Culver City, CA (US); Renhe Lin, Stevenson Ranch, CA (US)

(73) Assignee: PRC-DeSoto International, Inc., Sylmar, CA (US)

( * ) Notice: Subject to any disclaimer, the term of this patent is extended or adjusted under 35 U.S.C. 154(b) by 19 days.

(21) Appl. No.: 14/200,569

(22) Filed: Mar. 7, 2014

(65) Prior Publication Data

US 2015/0252232 A1    Sep. 10, 2015

(51) Int. Cl.
    *C09J 181/02*    (2006.01)
    *C08G 18/52*    (2006.01)
    *C08G 18/67*    (2006.01)
    *C08G 18/75*    (2006.01)
    *C08G 18/10*    (2006.01)
    *C08G 75/02*    (2016.01)
    *C09J 175/04*    (2006.01)

(52) U.S. Cl.
    CPC .............. *C09J 181/02* (2013.01); *C08G 18/10* (2013.01); *C08G 18/52* (2013.01); *C08G 18/6715* (2013.01); *C08G 18/758* (2013.01); *C08G 75/02* (2013.01); *C09J 175/04* (2013.01); *C08G 2190/00* (2013.01)

(58) Field of Classification Search
    CPC ........... C08G 18/6715; C08G 18/6705; C08G 18/52; C08G 18/672
    USPC ......................................................... 525/535
    See application file for complete search history.

(56) References Cited

U.S. PATENT DOCUMENTS

| | | | |
|---|---|---|---|
| 3,138,573 A | | 6/1964 | Fave et al. |
| 3,923,748 A | * | 12/1975 | Hutt et al. ....................... 528/75 |
| 4,031,271 A | * | 6/1977 | Bush .......................... 430/277.1 |
| 4,059,570 A | * | 11/1977 | Oswald ........................... 528/76 |
| 4,366,307 A | | 12/1982 | Singh et al. |
| 4,426,506 A | | 1/1984 | Blanco |
| 4,609,762 A | | 9/1986 | Morris et al. |
| 4,623,711 A | | 11/1986 | Morris et al. |
| 4,849,462 A | | 7/1989 | Bishop |
| 4,983,705 A | * | 1/1991 | Lewis et al. ................... 528/170 |
| 5,225,472 A | | 7/1993 | Cameron et al. |

(Continued)

FOREIGN PATENT DOCUMENTS

WO    2003/033500 B1    12/2003

OTHER PUBLICATIONS

Chan et al., "Nucleophile-Initiated Thiol-Michael Reactions: Effect of Organocatalyst, Thiol, and Ene," Macromolecules, 2010, vol. 43, p. 6381-6388.

(Continued)

*Primary Examiner* — Mike M Dollinger
(74) *Attorney, Agent, or Firm* — William R. Lambert

(57) ABSTRACT

Urethane-containing prepolymers formed from diisocyanates and adapted for Michael addition curing chemistries and compositions thereof for use in sealant applications are disclosed. The prepolymers provide compositions that exhibit room temperature stability and a controlled curing rate following a brief activation.

21 Claims, 1 Drawing Sheet

(56) References Cited

U.S. PATENT DOCUMENTS

| | | | |
|---|---|---|---|
| 5,310,862 A * | 5/1994 | Nomura et al. | 528/353 |
| 5,883,193 A * | 3/1999 | Karim | 525/113 |
| 6,172,179 B1 | 1/2001 | Zook et al. | |
| 6,211,320 B1 * | 4/2001 | Dershem et al. | 526/329.1 |
| 6,525,168 B2 | 2/2003 | Zook et al. | |
| 7,671,145 B2 | 3/2010 | Sawant et al. | |
| 8,541,513 B2 | 9/2013 | Hobbs et al. | |
| 8,871,896 B2 * | 10/2014 | Anderson et al. | 528/376 |
| 2004/0242867 A1 * | 12/2004 | Baudin et al. | 540/594 |
| 2007/0173602 A1 | 7/2007 | Brinkman et al. | |
| 2009/0012244 A1 * | 1/2009 | Rao et al. | 525/452 |
| 2009/0270554 A1 * | 10/2009 | Gilmore et al. | 524/609 |
| 2010/0010133 A1 | 1/2010 | Zook et al. | |
| 2010/0041839 A1 | 2/2010 | Anderson et al. | |
| 2011/0319559 A1 | 12/2011 | Kania et al. | |
| 2012/0040104 A1 | 2/2012 | Keledjian et al. | |
| 2012/0238707 A1 * | 9/2012 | Hobbs et al. | 525/473 |
| 2013/0345371 A1 | 12/2013 | Anderson et al. | |
| 2013/0345389 A1 | 12/2013 | Cai et al. | |
| 2014/0275474 A1 | 9/2014 | Rao et al. | |
| 2014/0378650 A1 | 12/2014 | Rao et al. | |
| 2015/0119549 A1 | 4/2015 | Rao et al. | |

OTHER PUBLICATIONS

Lowry et al., "Cure evaluation of Intelimer® latent curing agents for thermoset resin applications," presented at Thermoset Resin Formulators Association Meeting, Chicago, IL, Sep. 15-16, 2008.

Mather et al., "Michael addition reactions in macromolecular design for emerging technologies," Progress in Polymer Science, 2006, vol. 31, p. 487-531.

Yokel, "Aluminum chelation principles and recent advances," Coordination Chemistry Reviews, 2002, vol. 228, p. 97-113.

* cited by examiner

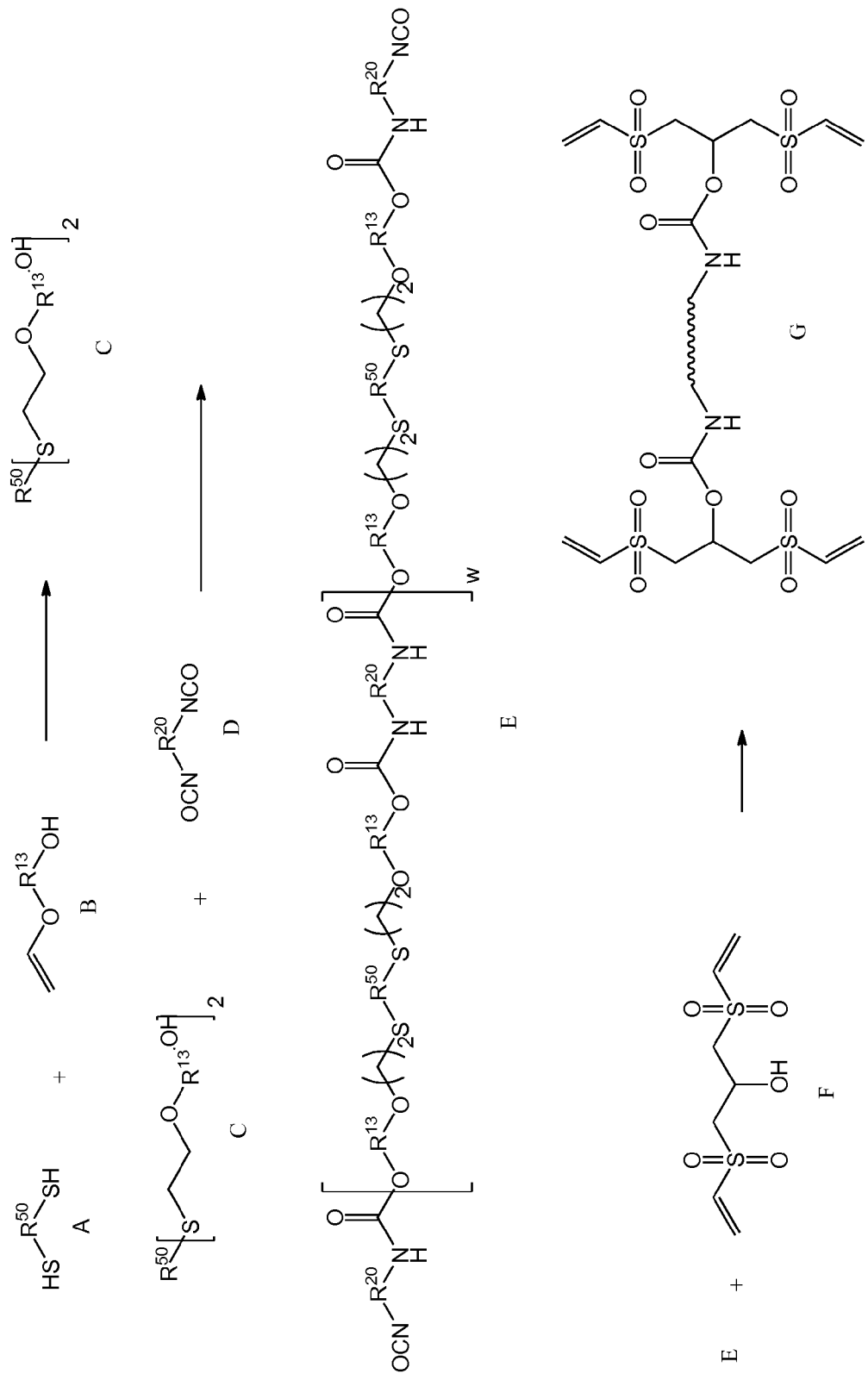

MICHAEL ACCEPTOR-TERMINATED URETHANE-CONTAINING FUEL RESISTANT PREPOLYMERS AND COMPOSITIONS THEREOF

FIELD

The present disclosure relates to Michael acceptor-terminated urethane-containing prepolymers and compositions thereof for use in sealant applications. The prepolymers provide compositions that exhibit room temperature stability and a controlled curing rate following a brief activation.

BACKGROUND

Sealants useful in aerospace and other applications must satisfy demanding mechanical, chemical, and environmental requirements. The sealants can be applied to a variety of surfaces including metal surfaces, primer coatings, intermediate coatings, finished coatings, and aged coatings.

Michael addition curing chemistries are often used in acrylic-based polymer systems and, as disclosed in U.S. Pat. No. 3,138,573, have also been adapted for use in polysulfide compositions. Application of Michael addition curing chemistries to sulfur-containing polymers not only results in cured sealants having faster curing rates and enhanced performance including fuel resistance and thermal resistance, but also provides sealants with improved physical properties such as elongation. The use of Michael addition curing chemistries for sulfur-containing polymer compositions useful in aerospace sealant applications is disclosed in U.S. Application Publication No. 2013/0345371, which is incorporated by reference in its entirety.

The compositions disclosed in U.S. Application Publication No. 2013/0345371 employ one or more base catalysts such as amine catalysts. In the presence of a suitable base such as 1,8-diazabicycloundec-7-ene (DBU) or 1,4-diazabicyclo[2.2.2]octane (DABCO) or a $C_{6-10}$ primary amine, the thiol-Michael addition reaction is fast and the cure time is typically less than 2 hours. Without a suitable base catalyst, the Michael addition reaction between, for example, a thiol-terminated polythioether and a Michael acceptor is slow providing a pot life, depending on the temperature, of several days to weeks. However, the physical properties of the cured composition are less than desired for certain applications. The reaction mechanisms for thiol-Michael addition reactions are disclosed by Chan et al., *Macromolecules* 2010, 43, 6381-6388.

In practice, the foregoing compositions can be provided as two-part formulations in which the thiol-terminated compound and the Michael acceptor are provided as separate components, with the amine catalyst in one or both components, and the two parts mixed shortly prior to use. For example, if the catalytic amine is a tertiary amine, the amine catalyst may be in one or both components, and if the catalytic amine is a primary or secondary amine, the amine catalyst can only be included in the component containing the thiol-terminated compound. Alternatively, the base catalyst may be provided as a third component, and the component containing the thiol-terminated compound, the component containing the Michael acceptor, and the component containing the base catalyst and the three components combined and mixed shortly before use. However, once the components are mixed, the Michael addition reaction proceeds and, depending at least in part on the temperature and on the type of amine catalyst, the pot life is limited to less than 2 hours. Furthermore, as the composition starts to cure, there is little ability to control the reaction rate to take advantage of the complex chemistries taking place after the sealant is applied to a surface. Amine catalyzed systems such as those disclosed in U.S. Pat. No. 6,172,179 typically cure within 2 hours to 12 hours and although exhibiting acceptable fuel resistance and thermal resistance for many aerospace sealant applications, a longer pot life such as from 24 hours to 72 hours and improved performance of the cured product is desirable.

Compositions having extended pot life and a controlled curing rate can be realized by using a controlled release amine catalyst. In these systems, an amine catalyst such as a strong base or primary amine that produces a fast reaction rate is protected or encapsulated and dispersed in a composition. Upon exposure, for example, to ultraviolet radiation, moisture, or temperature, the catalytic amine is released and catalyzes the Michael addition reaction. In certain embodiments, such systems provide a pot life greater than 2 hours to 12 hours and cure within 24 to 72 hours after the useful working time. Controlled release amine catalysts have been used as described in U.S. Application Publication No. 2013/0345389, which is incorporated by reference in its entirety. Use of controlled release catalysts can provide cure on demand systems. Although the performance of cured sealants prepared using controlled release amine-catalyzed Michael addition curable sulfur-containing polymer compositions is acceptable for many aerospace sealant applications, improved properties such as increased tensile strength is desired.

SUMMARY

Michael acceptor-terminated urethane-containing prepolymers and the use of such prepolymers in sealant compositions having improved cured properties and controlled Michael addition reaction rates are disclosed.

In a first aspect, Michael acceptor-terminated urethane-containing prepolymers are provided, comprising the reaction product of reactants comprising (a) an isocyanate-terminated sulfur-containing adduct; and (b) a compound comprising a group reactive with an isocyanate; and at least one Michael acceptor group.

In a second aspect, compositions are provided, comprising a Michael acceptor-terminated urethane-containing prepolymer provided by the present disclosure; a thiol-terminated sulfur-containing prepolymer; and an amine catalyst.

In a third aspect, methods of synthesizing a Michael acceptor-terminated urethane-containing prepolymer are provided, comprising reacting a thiol-terminated sulfur-containing adduct with a hydroxy vinyl ether to provide a hydroxy-terminated sulfur-containing adduct; reacting the hydroxy-terminated sulfur-containing adduct with a polyisocyanate to provide an isocyanate-terminated urethane-containing adduct; and reacting the isocyanate-terminated urethane-containing adduct with a compound comprising a group reactive with an isocyanate; and at least one Michael acceptor group, to provide the Michael acceptor-terminated urethane-containing prepolymer.

Reference is now made to certain embodiments of compositions and methods. The disclosed embodiments are not intended to be limiting of the claims. To the contrary, the claims are intended to cover all alternatives, modifications, and equivalents.

BRIEF DESCRIPTION OF THE DRAWINGS

FIG. 1 shows a reaction scheme for the preparation of Michael acceptor-terminated urethane-containing prepolymers according to certain embodiments of the present disclosure.

DETAILED DESCRIPTION

For purposes of the following description, it is to be understood that embodiments provided by the present disclosure may assume various alternative variations and step sequences, except where expressly specified to the contrary. Moreover, other than in the examples, or where otherwise indicated, all numbers expressing, for example, quantities of ingredients used in the specification and claims are to be understood as being modified in all instances by the term "about." Accordingly, unless indicated to the contrary, the numerical parameters set forth in the following specification and attached claims are approximations that may vary depending upon the desired properties to be obtained. At the very least, and not as an attempt to limit the application of the doctrine of equivalents to the scope of the claims, each numerical parameter should at least be construed in light of the number of reported significant digits and by applying ordinary rounding techniques.

Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard variation found in their respective testing measurements.

Also, it should be understood that any numerical range recited herein is intended to include all sub-ranges encompassed therein. For example, a range of "1 to 10" is intended to include all sub-ranges between (and including) the recited minimum value of about 1 and the recited maximum value of about 10, that is, having a minimum value equal to or greater than about 1 and a maximum value of equal to or less than about 10. Also, in this application, the use of "or" means "and/or" unless specifically stated otherwise, even though "and/or" may be explicitly used in certain instances.

A dash ("-") that is not between two letters or symbols is used to indicate a point of covalent bonding for a substituent or between two atoms. For example, the chemical group —$CONH_2$ is covalently bonded to another chemical moiety through the carbon atom. In certain instances, the expression "-*" is used to denote the point of bonding.

"Alkanearene" refers to a hydrocarbon group having one or more aryl and/or arenediyl groups and one or more alkyl and/or alkanediyl groups, where aryl, arenediyl, alkyl, and alkanediyl are defined herein. In certain embodiments, each aryl and/or arenediyl group(s) is $C_{6-12}$, $C_{6-10}$, and in certain embodiments, phenyl or benzenediyl. In certain embodiments, each alkyl and/or alkanediyl group(s) is $C_{1-6}$, $C_{1-4}$, $C_{1-3}$, and in certain embodiments, methyl, methanediyl, ethyl, or ethane-1,2-diyl. In certain embodiments, the alkanearene group is $C_{4-18}$ alkanearene, $C_{4-16}$ alkanearene, $C_{4-12}$ alkanearene, $C_{4-8}$ alkanearene, $C_{6-12}$ alkanearene, $C_{6-10}$ alkanearene, and in certain embodiments, $C_{6-9}$ alkanearene. Examples of alkanearene groups include diphenyl methane.

"Alkanearenediyl" refers to a diradical of an alkanearene group. In certain embodiments, the alkanearenediyl group is $C_{4-18}$ alkanearenediyl, $C_{4-16}$ alkanearenediyl, $C_{4-12}$ alkanearenediyl, $C_{4-8}$ alkanearenediyl, $C_{6-12}$ alkanearenediyl, $C_{6-10}$ alkanearenediyl, and in certain embodiments, $C_{6-9}$ alkanearenediyl. Examples of alkanearenediyl groups include diphenyl methane-4,4'-diyl.

"Alkanediyl" refers to a diradical of a saturated, branched or straight-chain, acyclic hydrocarbon group, having, for example, from 1 to 18 carbon atoms ($C_{1-18}$), from 1 to 14 carbon atoms ($C_{1-14}$), from 1 to 6 carbon atoms ($C_{1-6}$), from 1 to 4 carbon atoms ($C_{1-4}$), or from 1 to 3 hydrocarbon atoms ($C_{1-3}$). It will be appreciated that a branched alkanediyl has a minimum of three carbon atoms. In certain embodiments, the alkanediyl is $C_{2-14}$ alkanediyl, $C_{2-10}$ alkanediyl, $C_{2-8}$ alkanediyl, $C_{2-6}$ alkanediyl, $C_{2-4}$ alkanediyl, and in certain embodiments, $C_{2-3}$ alkanediyl. Examples of alkanediyl groups include methane-diyl (—$CH_2$—), ethane-1,2-diyl (—$CH_2CH_2$—), propane-1,3-diyl and iso-propane-1,2-diyl (e.g., —$CH_2CH_2CH_2$— and —$CH(CH_3)CH_2$—), butane-1,4-diyl (—$CH_2CH_2CH_2CH_2$—), pentane-1,5-diyl (—$CH_2CH_2CH_2CH_2CH_2$—), hexane-1,6-diyl (—$CH_2CH_2CH_2CH_2CH_2CH_2$—), heptane-1,7-diyl, octane-1,8-diyl, nonane-1,9-diyl, decane-1,10-diyl, dodecane-1,12-diyl, and the like.

"Alkanecycloalkane" refers to a saturated hydrocarbon group having one or more cycloalkyl and/or cycloalkanediyl groups and one or more alkyl and/or alkanediyl groups, where cycloalkyl, cycloalkanediyl, alkyl, and alkanediyl are defined herein. In certain embodiments, each cycloalkyl and/or cycloalkanediyl group(s) is $C_{3-6}$, $C_{5-6}$, and in certain embodiments, cyclohexyl or cyclohexanediyl. In certain embodiments, each alkyl and/or alkanediyl group(s) is $C_{1-6}$, $C_{1-4}$, $C_{1-3}$, and in certain embodiments, methyl, methanediyl, ethyl, or ethane-1,2-diyl. In certain embodiments, the alkanecycloalkane group is $C_{4-18}$ alkanecycloalkane, $C_{4-16}$ alkanecycloalkane, $C_{4-12}$ alkanecycloalkane, $C_{4-8}$ alkanecycloalkane, $C_{6-12}$ alkanecycloalkane, $C_{6-10}$ alkanecycloalkane, and in certain embodiments, $C_{6-9}$ alkanecycloalkane. Examples of alkanecycloalkane groups include 1,1,3,3-tetramethylcyclohexane and cyclohexylmethane.

"Alkanecycloalkanediyl" refers to a diradical of an alkanecycloalkane group. In certain embodiments, the alkanecycloalkanediyl group is $C_{4-18}$ alkanecycloalkanediyl, $C_{4-16}$ alkanecycloalkanediyl, $C_{4-12}$ alkanecycloalkanediyl, $C_{4-8}$ alkanecycloalkanediyl, $C_{6-12}$ alkanecycloalkanediyl, $C_{6-10}$ alkanecycloalkanediyl, and in certain embodiments, $C_{6-9}$ alkanecycloalkanediyl. Examples of alkanecycloalkanediyl groups include 1,1,3,3-tetramethylcyclohexane-1,5-diyl and cyclohexylmethane-4,4'-diyl.

"Alkenyl" refers to a group having the structure —$CR=CR_2$ where the alkenyl group is a terminal group and is bonded to a larger molecule. In such embodiments, each R may be selected from, for example, hydrogen and $C_{1-3}$ alkyl. In certain embodiments, each R is hydrogen and an alkenyl group has the structure —$CH=CH_2$.

"Alkoxy" refers to a —OR group where R is alkyl as defined herein. Examples of alkoxy groups include methoxy, ethoxy, n-propoxy, isopropoxy, and n-butoxy. In certain embodiments, the alkoxy group is $C_{1-8}$ alkoxy, $C_{1-6}$ alkoxy, $C_{1-4}$ alkoxy, and in certain embodiments, $C_{1-3}$ alkoxy.

"Alkyl" refers to a monoradical of a saturated, branched or straight-chain, acyclic hydrocarbon group having, for example, from 1 to 20 carbon atoms, from 1 to 10 carbon atoms, from 1 to 6 carbon atoms, from 1 to 4 carbon atoms, or from 1 to 3 carbon atoms. It will be appreciated that a branched alkyl has a minimum of three carbon atoms. In certain embodiments, the alkyl group is $C_{1-6}$ alkyl, $C_{1-4}$ alkyl, and in certain embodiments, $C_{1-3}$ alkyl. Examples of alkyl groups include methyl, ethyl, n-propyl, iso-propyl, n-butyl, iso-butyl, tert-butyl, n-hexyl, n-decyl, tetradecyl, and the like. In certain embodiments, the alkyl group is $C_{1-6}$ alkyl, $C_{1-4}$ alkyl, and in certain embodiments, $C_{1-3}$ alkyl. It will be appreciated that a branched alkyl has at least three carbon atoms.

"Cycloalkanediyl" refers to a diradical saturated monocyclic or polycyclic hydrocarbon group. In certain embodiments, the cycloalkanediyl group is $C_{3-12}$ cycloalkanediyl, $C_{3-8}$ cycloalkanediyl, $C_{3-6}$ cycloalkanediyl, and in certain embodiments, $C_{5-6}$ cycloalkanediyl. Examples of cycloalkanediyl groups include cyclohexane-1,4-diyl, cyclohexane-1,3-diyl, and cyclohexane-1,2-diyl.

"Cycloalkyl" refers to a saturated monocyclic or polycyclic hydrocarbon monoradical group. In certain embodiments, the cycloalkyl group is $C_{3-12}$ cycloalkyl, $C_{3-8}$ cycloalkyl, $C_{3-6}$ cycloalkyl, and in certain embodiments, $C_{5-6}$ cycloalkyl.

"Heteroalkanediyl" refers to an alkanediyl group in which one or more of the carbon atoms are replaced with a heteroatom, such as N, O, S, or P. In certain embodiments of heteroalkanediyl, a heteroatom is selected from N and O.

"Heteroalkanearenediyl" refers to an alkanearenediyl group in which one or more of the carbon atoms are replaced with a heteroatom, such as N, O, S, or P. In certain embodiments of heteroalkanearenediyl, the heteroatom is selected from N and O.

"Heterocycloalkanediyl" refers to a cycloalkanediyl group in which one or more of the carbon atoms are replaced with a heteroatom, such as N, O, S, or P. In certain embodiments of heterocycloalkanediyl, the heteroatom is selected from N and O.

"Derived from" refers to a functional group or moiety following reaction with another reactive functional group or moiety. For example, the moiety —$CH_2$—$CH_2$—S— can be derived from the reaction of an alkenyl group, —CH=$CH_2$ with a thiol group —SH. Similarly, the moiety —S— can be derived from the reaction of —SH with a group that is reactive with thiol groups. In certain embodiments, a group —R'— is derived from the reaction of the group —R with a reactive group. In certain embodiments, a moiety —R' is derived from the reaction of a compound R with a reactive group.

Core of a sulfur-containing prepolymer or adduct refers to the moiety forming the sulfur-containing prepolymer or adduct without the terminal functional groups. For example, the core of sulfur-containing prepolymer or adduct having the structure $R^f$—R—$R^f$ where each $R^f$ represents a moiety comprising a terminal functional group, is —R—.

Core of a diisocyanate refers to the moiety forming the diisocyanate without the isocyanate groups. For example, the core of a diisocyanate having the structure O=C=N—R—N=C=O is represented by —R—.

A "Michael acceptor" refers to an activated alkene, such as an alkenyl group proximate to an electron-withdrawing group such as, for example, a ketone, halo, carbonyl (—CO), nitro (—$NO_2$), nitrile (—CN), alkoxycarbonyl (—COOR), phosphonate (—PO(OR)$_2$), trifluoromethyl (—$CF_3$), sulfonyl (—$SO_2$—), trifluormethanesulfonyl (—$SO_2CF_3$), or p-toluenesulfonyl (—$SO_2$—$C_6H_4$—$CH_3$). In certain embodiments, a Michael acceptor group is selected from a vinyl ketone, a vinyl sulfone, a quinone, an enamine, a ketimine, an aldimine, an oxazolidine, and an acrylate. In certain embodiments, a Michael acceptor or Michael acceptor group does not encompass acrylates.

A "Michael acceptor compound" refers to a compound comprising at least one Michael acceptor group. In certain embodiments, a Michael acceptor compound is divinyl sulfone, and a Michael acceptor group is vinylsulfonyl, e.g., —$S(O)_2$—CH=$CH_2$. Other examples of Michael acceptors are disclosed in Mather et al., *Prog. Polym. Sci.*, 2006, 31, 487-531, and include acrylate esters, acrylonitrile, acrylamides, maleimides, alkyl methacrylates, cyanoacrylates. Types of compounds that function as Michael acceptors include vinyl ketones, quinones, nitroalkenes, acrylonitriles, acrylates, methacrylates, cyanoacrylates, acrylamides, maleimides, dialkyl vinylphosphonate, and vinylsulfones. Other Michael acceptors include vinyl ketones, α,β-unsaturated aldehydes, vinyl phosphonates, acrylonitrile, vinyl pyridines, certain azo compounds, β-keto acetylenes and acetylene esters. In certain embodiments, a Michael acceptor compound is divinyl sulfone, and a Michael acceptor group is vinylsulfonyl, i.e., —$S(O)_2$—CH=$CH_2$. In certain embodiments, a Michael acceptor compound is a bis(vinylsulfonyl) alkanol, and a Michael acceptor group is 1-(ethylenesulfonyl)-n-(vinylsulfonyl)alkanol, i.e., —$CH_2$—$CH_2$—$S(O)_2$—$R^{10}$—CH(—OH)—$R^{10}$—$S(O)_2$—CH=$CH_2$, and in certain embodiments, 1-(ethylenesulfonyl)-3-(vinylsulfonyl)propan-2-ol (—$CH_2$—$CH_2$—$S(O)_2$—$CH_2$—CH(—OH)—$CH_2$—$S(O)_2$—CH=$CH_2$).

Michael acceptor compounds having more than one Michael acceptor group are also well known. Examples include diacrylates such as ethylene glycol diacrylate and diethylene glycol diacrylate, dimethacrylates such as ethylene glycol methacrylate and diethylene glycol methacrylate, bismaleimides such as N,N'-(1,3-phenylene)dimaleimide and 1,1'-(methylenedi-4,1-phenylene)bismaleimide, vinylsulfones such as divinyl sulfone and 1,3-bis(vinylsulfonyl)-2-propanol, etc. In certain embodiments, a Michael acceptor group has the structure of Formula (1a) or Formula (1b):

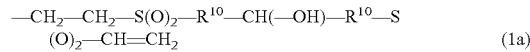

$$—CH_2—CH_2—S(O)_2—R^{10}—CH(—OH)—R^{10}—S(O)_2—CH=CH_2 \quad (1a)$$

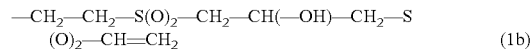

$$—CH_2—CH_2—S(O)_2—CH_2—CH(—OH)—CH_2—S(O)_2—CH=CH_2 \quad (1b)$$

where each $R^{10}$ is independently selected from $C_{1-3}$ alkanediyl.

A "metal ligand" refers to an ion or molecule that binds to a metal atom and potentially other atoms to form a coordination complex. The bonding between the metal and or atoms generally involves donation of one or more electronic pairs to the metal and the nature of the bonding can be covalent or ionic. Metal ligands provided by the present disclosure are capable of forming coordination complexes to aerospace surfaces such as aluminum and titanium surfaces, which may be oxidized. In the case of oxidized surfaces a metal ligand may form a coordination complex with a metal such as Al(III) and oxygen atoms. The coordination complex can enhance the adhesion of a coating or sealant to the metal or oxidized metal surface.

Metal ligands may be incorporated into the backbone of a prepolymer. Such reactive metal ligands may be commercially available or may be derivatized to include appropriate reactive substituent groups using methods known to those skilled in the art. Examples of sulfur-containing polymers incorporating metal ligands are disclosed in U.S. Application Publication No. 2014/0378650, and U.S. Application Publication No. 2014/0275474, each of which is incorporated by reference in its entirety.

Hydroxypyridinones comprise groups such as 3-hydroxy-4-pyridinone and 3-hydroxy-2-pyridinone having the structure of Formula (2a) or Formula (2b), respectively:

(2a)

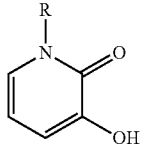

(2b)

where R is an organic groups such as an alkyl group. A metal ligand derived from a hydroxypyridinone comprises a hydroxypyridinone group and one or more reactive functional groups such as terminal thiol groups.

An "acetylacetonate group" refers to a group having the structure:

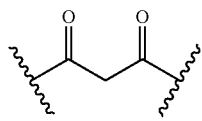 [SMILES: *C(=O)CC(*)=O]

In certain embodiments, an acetylacetonate refers to a metal chelating agent comprising an acetylacetonate ligand and one or more reactive functional groups. In certain embodiments, the one or more reactive functional groups can be reactive with a thiol group such as an epoxy group, an alkenyl group, a Michael acceptor group, or a group comprising a saturated carbon bearing a leaving group that are well suited for nucleophilic substitution such as, for example, —Cl, —Br, —I, —OSO$_2$CH$_3$ (mesylate), —OSO$_2$—C$_6$H$_4$—CH$_3$ (tosylate), etc.

"Quinones" refer to compounds having a fully conjugated cyclic dione structure derived from aromatic compounds by conversion of an even number of —CH═ groups into —C(═O)— groups with any necessary rearrangement of double bonds. Examples of quinones include 1,2-benzoquinone, 1,4-benzoquinone, 1,4-naphthaloquinone, and 9,10-anthraquinone. Quinone groups can be metal ligands.

A "maleimide" refers to a compound having a maleimide group:

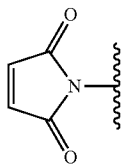

A bismaleimide refers to a compound having two maleimide groups, where the two maleimide groups are bonded by the nitrogen atoms via a linker. Maleimide-terminated sulfur-containing prepolymers are disclosed in U.S. Application Publication No. 2015/0119549, which is incorporated by reference in its entirety.

A "bis(sulfonyl)alkanol group" refers to a group having the general Formula (4):

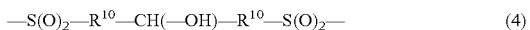

—S(O)$_2$—R$^{10}$—CH(—OH)—R$^{10}$—S(O)$_2$—   (4)

where each R$^{10}$ is independently selected from C$_{1-3}$ alkanediyl. In certain embodiments, a bis(sulfonyl)alkanol group has the structure —CH$_2$—CH$_2$—S(O)$_2$—R$^{10}$—CH(—OH)—R$^{10}$—S(O)$_2$—CH$_2$—CH$_2$—, and in certain embodiments, —CH$_2$—CH$_2$—S(O)$_2$—R$^{10}$—CH(—OH)—R$^{10}$—S(O)$_2$—CH═CH$_2$.

In certain embodiments, a "bis(sulfonyl)alkanol group" can be a monovalent bis(sulfonyl)alkanol group or a divalent bis(sulfonyl)alkanol group. In certain embodiments, a monovalent bis(sulfonyl)alkanol can be a terminal bis(sulfonyl)alkanol group such as a "1-(ethylenesulfonyl)-n-(vinylsulfonyl)alkanol group." A terminal bis(sulfonyl)alkanol group can be derived from the reaction of a bis(sulfonyl) alkanol and can have a terminal moiety with the general structure —R$^{8'}$—S(O)$_2$—R$^{10}$—CH(—OH)—R$^{10}$—S(O)$_2$—R$^8$ where R$^{8'}$ is a moiety derived from the reaction of R$^8$ with a moiety reactive with R$^8$; each R$^{10}$ is independently selected from C$_{1-3}$ alkanediyl. In certain embodiments, each R$^8$ comprises a reactive functional group, and in certain embodiments, is —CH═CH$_2$. In certain embodiments, a terminal bis(sulfonyl)alkanol group is a 1-(ethylenesulfonyl)-n-(vinylsulfonyl)alkanol group such as 1-(ethylenesulfonyl)-3-(vinylsulfonyl)propan-2-ol, i.e., —CH$_2$—CH$_2$—S(O)$_2$—CH$_2$—CH(—OH)—CH$_2$—S(O)$_2$—CH═CH$_2$. In certain embodiments, a terminal bis(sulfonyl)alkanol group has the structure —CH$_2$—CH$_2$—S(O)$_2$—R$^{10}$—CH(—OH)—R$^{10}$—S(O)$_2$—CH═CH$_2$.

In certain embodiments, a bis(sulfonyl)alkanol group can also be divalent such as when the group is incorporated into the backbone of a prepolymer such as the sulfur-containing prepolymers and adducts disclosed herein. In certain embodiments, a divalent bis(sulfonyl)alkanol group can have the general structure —R$^{8'}$—S(O)$_2$—R$^{10}$—CH(—OH)—R$^{10}$—S(O)$_2$—R$^{8'}$—; in certain embodiments, —CH$_2$—CH$_2$—S(O)$_2$—R$^{10}$—CH(—OH)—R$^{10}$—S(O)$_2$—CH$_2$—CH$_2$—, in certain embodiments, —R$^{8'}$—S(O)$_2$—CH$_2$—CH(—OH)—CH$_2$—S(O)$_2$—R$^{8'}$—, and in certain embodiments, —CH$_2$—CH$_2$—S(O)$_2$—CH$_2$—CH(—OH)—CH$_2$—S(O)$_2$—CH$_2$—CH$_2$—, where R$^{8'}$ and R$^{10}$ are as defined herein. In certain embodiments of a bis(sulfonyl)alkanol, each R$^8$ is an alkenyl group, each R$^{8'}$ is an ethane-diyl group and/or each R$^{10}$ is methane-diyl.

A "bis(sulfonyl)alkanol" refers to a compound of the general formula R$^8$—S(O)$_2$—R$^{10}$—CH(—OH)—R$^{10}$—S(O)$_2$—R$^8$ where each R$^8$ is a moiety having a reactive functional group; and each R$^{10}$ is independently selected from C$_{1-3}$ alkanediyl. In certain embodiments, each R$^8$ comprises a terminal group reactive with a thiol group such as, for example, an alkenyl group, an epoxy group, a Michael acceptor group, or a group comprising a saturated carbon bearing a leaving group that are well suited for nucleophilic substitution such as, for example, —Cl, —Br, —I, —OSO$_2$CH$_3$ (mesylate), —OSO$_2$—C$_6$H$_4$—CH$_3$ (tosylate), etc. In certain embodiments, a bis(sulfonyl)alkanol may be a bis(vinylsulfonyl)alkanol comprising terminal alkenyl groups. In certain embodiments a bis(sulfonyl)alkanol may be a bis(vinylsulfonyl)alkanol in which R$^8$ comprises a terminal alkenyl group, such as a compound having the formula CH$_2$═CH—S(O)$_2$—R$^{10}$—CH(—OH)—R$^{10}$—S(O)$_2$—CH═CH$_2$. In certain embodiments, a bis(vinylsulfonyl)alkanol is 1,3-bis(vinylsulfonyl)-2-propanol. In certain embodiments, a bis(sulfonyl)alkanol containing compound can be prepared by reacting a bis(vinylsulfonyl)alkanol with a compound having a reactive terminal functional group and a terminal group reactive with the terminal alkenyl groups of the bis(vinylsulfonyl)alkanol such as a thiol group or an epoxy group. In such embodiments, the bis(sulfonyl)alkanol can have the structure R$^{8'}$—CH$_2$—CH$_2$—S(O)$_2$—R$^{10}$—CH(—OH)—R$^{10}$—S(O)$_2$—CH$_2$—CH$_2$—R$^{8'}$ where each R$^{8'}$ is a moiety derived from the reaction of the compound with the terminal alkenyl groups of the bis(vinylsulfonyl)alkanol.

As used herein, "polymer" refers to oligomers, homopolymers, and copolymers, which may be cured or uncured.

Unless stated otherwise, molecular weights are number average molecular weights for polymeric materials indicated as "$M_n$" as determined, for example, by gel permeation chromatography using a polystyrene standard in an art-recognized manner. Unless stated otherwise, molecular weights are number average molecular weights for polymeric materials indicated as "Mn" as may be determined, for example, by gel permeation chromatography using a polystyrene standard in an art-recognized manner.

"Prepolymers" refer to polymers prior to curing. In general, prepolymers provided by the present disclosure are liquid at room temperature. "Adducts" refer to prepolymers that are functionalized with a reactive terminal group; however, prepolymers may also contain terminal functional group. Thus, the terms prepolymer and adduct are used interchangeably. The term adduct is often used to refer to a prepolymer that is an intermediate in a reaction sequence used to prepare a prepolymer.

"Polythioether" refers to a compound containing at least two thioether linkages, that is "—$CR_2$—S—$CR_2$—" groups. In addition to at least two thioether groups, polythioethers provided by the present disclosure may comprise at least two formal, acetal, and/or ketal groups, e.g., at least two —O—$CR_2$—O— groups, where each R is independently selected from hydrogen, $C_{1-6}$ alkyl, $C_{7-12}$ phenylalkyl, substituted $C_{7-12}$ phenylalkyl, $C_{6-12}$ cycloalkylalkyl, substituted $C_{6-12}$ cycloalkylalkyl, $C_{3-12}$ cycloalkyl, substituted $C_{3-12}$ cycloalkyl, $C_{6-12}$ aryl, and substituted $C_{6-12}$ aryl. In certain embodiments, such compounds are prepolymers or adducts. Suitable polythioethers are disclosed, for example, in U.S. Pat. No. 6,172,179, which is incorporated by reference in its entirety.

"Substituted" refers to a group in which one or more hydrogen atoms are each independently replaced with the same or different substituent(s). In certain embodiments, a substituent is selected from halogen, —$S(O)_2OH$, —$S(O)_2$, —SH, —SR where R is $C_{1-6}$ alkyl, —COOH, —$NO_2$, —$NR_2$ where each R is independently selected from hydrogen and $C_{1-3}$ alkyl, —CN, —C═O, $C_{1-6}$ alkyl, —$CF_3$, —OH, phenyl, $C_{2-6}$ heteroalkyl, $C_{5-6}$ heteroaryl, $C_{1-6}$ alkoxy, and —COR where R is $C_{1-6}$ alkyl. In certain embodiments, a substituent is chosen from —OH, —$NH_2$, and $C_{1-3}$ alkyl.

Reference is now made to certain embodiments of Michael acceptor-terminated urethane-containing prepolymers such as Michael acceptor-terminated urethane-containing polythioethers, compositions thereof, and methods of synthesis. The disclosed embodiments are not intended to be limiting of the claims. To the contrary, the claims are intended to cover all alternatives, modifications, and equivalents.

Michael acceptor-terminated urethane-containing prepolymers comprising urethane segments incorporated into the backbone are disclosed. The Michael acceptor-terminated urethane-containing prepolymers are useful in providing cured sealants having enhanced tensile strength.

Michael acceptor-terminated urethane-containing prepolymers provided by the present disclosure represent an improvement over previously disclosed Michael acceptor-terminated sulfur-containing prepolymers such as those disclosed in U.S. Application Publication Nos. 2013/0345371 and 2013/0345389. Cured sealants prepared from Michael acceptor-terminated urethane-containing prepolymers provided by the present disclosure exhibit enhanced tensile strength and surface adhesion compared to the Michael acceptor-terminated sulfur-containing prepolymers disclosed in those applications. The enhanced tensile strength is believed to be imparted by the incorporation of urethane segments into the polymer backbone and the improved surface adhesion is believed to result from termination with groups that function as both metal ligands and as Michael acceptors.

Michael acceptor-terminated urethane-containing prepolymers comprise a urethane- and sulfur-containing backbone capped with isocyanate groups that are further capped with Michael acceptor groups.

Michael acceptor-terminated urethane-containing prepolymers include polythioethers, polysulfides, and combinations of any of the foregoing. In certain embodiments, a sulfur-containing prepolymer may be difunctional, and in certain embodiments, may have a functionality greater than 2 such as 3, 4, 5, or 6. A sulfur-containing prepolymer may comprise a mixture of sulfur-containing prepolymers having different functionalities characterized by an average functionality from 2.05 to 6, from 2.1 to 4, from 2.1 to 3, from 2.2 to 2.8, and in certain embodiments, from 2.4 to 2.6.

It can be appreciated that Michael acceptor-terminated urethane-containing prepolymers provided by the present disclosure may be synthesized by a number of routes. The functional groups of the precursors can be adapted and selected for a particular reaction chemistry. For example, in certain embodiments, it can be convenient that the sulfur-containing prepolymer comprise thiol or hydroxy functional groups. In embodiments in which the sulfur-containing prepolymer has functional hydroxy groups, a diisocyanate may be directly reacted with the sulfur-containing prepolymer. In embodiments in which the precursor sulfur-containing prepolymer is thiol-terminated, the thiol groups may be capped with a hydroxy functional compound to provide a hydroxy-terminated sulfur-containing prepolymer that may then be reacted with a diisocyanate.

Examples of suitable polythioethers are disclosed, for example, in U.S. Pat. No. 6,172,179.

In certain embodiments, a Michael acceptor-terminated urethane-containing prepolymer comprises a polythioether comprising a backbone comprising the structure of Formula (5):

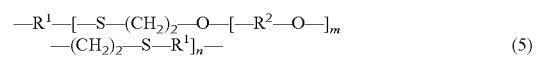

$$-R^1-[-S-(CH_2)_2-O-[-R^2-O-]_m-(CH_2)_2-S-R^1]_n- \qquad (5)$$

wherein, each $R^1$ is independently selected from a $C_{2-10}$ n-alkanediyl group, a $C_{3-6}$ branched alkanediyl group, a $C_{6-8}$ cycloalkanediyl group, a $C_{6-10}$ alkanecycloalkanediyl group, a heterocyclic group, a —[(—$CHR^3$—)$_p$—X—]$_q$—(CHR$^3$)$_r$— group, wherein each $R^3$ is selected from hydrogen and methyl;

each $R^2$ is independently selected from a $C_{2-10}$ n-alkanediyl group, a $C_{3-6}$ branched alkanediyl group, a $C_{6-8}$ cycloalkanediyl group, a $C_{6-14}$ alkanecycloalkanediyl group, a heterocyclic group, and a —[(—$CH_2$—)$_p$—X—]$_q$—(CH$_2$)$_r$— group;

each X is independently selected from O, S, and —NR—, wherein R is selected from hydrogen and methyl;

m ranges from 0 to 50;

n is an integer ranging from 1 to 60;

p is an integer ranging from 2 to 6;

q is an integer ranging from 1 to 5; and r is an integer ranging from 2 to 10.

In certain embodiments of a compound of Formula (5), $R^1$ is —[—(CHR$^3$)$_s$—X—]$_q$—(CHR$^3$)$_r$— wherein each X is independently selected from —O— and —S—. In certain embodiments wherein $R^1$ is —[—(CHR$^3$)$_s$—X—]$_q$—(CHR$^3$)$_r$—, each X is —O— and in certain embodiments, each X is —S—.

In certain embodiments of a compound of Formula (5), $R^1$ is $-[-(CH_2)_s-X-]_q-(CH_2)_r-$ wherein each X is independently selected from $-O-$ and $-S-$. In certain embodiments wherein $R^1$ is $-[-(CH_2)_s-X-]_q-(CH_2)_r-$, each X is $-O-$ and in certain embodiments, each X is $-S-$.

In certain embodiments, $R^1$ in Formula (5) is $-[(-CH_2-)_p-X-]_q-(CH_2)_r-$, where p is 2, X is O, q is 2, r is 2, $R^2$ is ethanediyl, m is 2, and n is 9.

In certain embodiments of Formula (5), each $R^1$ is derived from dimercaptodioxaoctane (DMDO) and in certain embodiments, each $R^1$ is derived from dimercaptodiethylsulfide (DMDS).

In certain embodiments of Formula (5), each m is independently an integer from 1 to 3. In certain embodiments, each m is the same and is 1, 2, and in certain embodiments, 3.

In certain embodiments of Formula (5), n is an integer from 1 to 30, an integer from 1 to 20, an integer from 1 to 10, and in certain embodiments, and an integer from 1 to 5. In addition, in certain embodiments, n may be any integer from 1 to 60.

In certain embodiments of Formula (5), each p is independently selected from 2, 3, 4, 5, and 6. In certain embodiments, each p is the same and is 2, 3, 4, 5, or 6.

Polysulfides refer to prepolymers that contain one or more sulfide linkages, i.e., $-S_x-$ linkages, where x is from 2 to 4, in the polymer backbone and/or in pendant positions on the prepolymer chain. In certain embodiments, the polysulfide prepolymer will have two or more sulfur-sulfur linkages. Suitable polysulfides are commercially available, for example, from Akzo Nobel and Toray Fine Chemicals under the names Thiokol-LP and Thioplast®. Thioplast® products are available in a wide range of molecular weights ranging, for example, from less than 1,100 to over 8,000, with molecular weight being the average molecular weight in grams per mole. In some cases, the polysulfide has a number average molecular weight of 1,000 Daltons to 4,000 Daltons. Examples of suitable polysulfides are disclosed, for example, in U.S. Pat. No. 4,623,711.

In certain embodiments, a Michael acceptor-terminated urethane-containing prepolymer comprises a metal ligand-containing Michael acceptor-terminated urethane-containing prepolymer in which a metal ligand is incorporated into the backbone of the prepolymer. Metal-ligand containing sulfur-containing prepolymers are disclosed in U.S. Application Publication No. 2014/0275474, which is incorporated by reference in its entirety.

In certain embodiments, a Michael acceptor-terminated urethane-containing prepolymer comprises a Michael acceptor-terminated urethane-containing prepolymer of Formula (6a), a Michael acceptor-terminated urethane-containing prepolymer of Formula (6b), or a combination thereof:

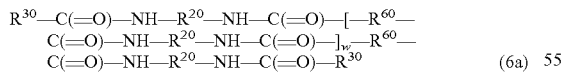  (6a)

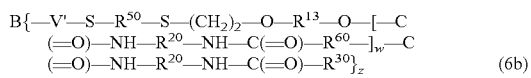  (6b)

wherein,
w is an integer from 1 to 100;
each $R^{13}$ independently comprises $C_{2-10}$ alkanediyl;
each $R^{20}$ independently comprises a core of a diisocyanate;
each $R^{30}$ independently comprises at least one terminal Michael acceptor group;
each $R^{50}$ independently comprises a core of a sulfur-containing prepolymer;

each $R^{60}$ independently comprises a moiety having the structure of Formula (7):

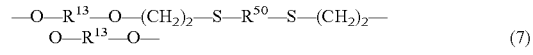  (7)

B represents a core of a z-valent, polyfunctionalizing agent $B(-V)_z$ wherein,
z is an integer from 3 to 6; and
each V is a moiety comprising a terminal group reactive with a thiol group; and
each $-V'-$ is derived from the reaction of $-V$ with a thiol.

In certain embodiments, each $R^{50}$ is derived from a polythioether and has the structure of Formula (5):

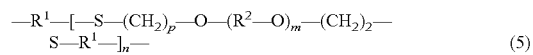  (5)

wherein,
each $R^1$ independently is selected from $C_{2-10}$ alkanediyl, $C_{6-8}$ cycloalkanediyl, $C_{6-14}$ alkanecycloalkanediyl, $C_{5-8}$ heterocycloalkanediyl, and $-[(-CHR^3-)_s-X-]_q-(-CHR^3-)_r-$, wherein,
s is an integer from 2 to 6;
q is an integer from 1 to 5;
r is an integer from 2 to 10;
each $R^3$ is independently selected from hydrogen and methyl; and
each X is independently selected from $-O-$, $-S-$, and $-NR-$, wherein R is selected from hydrogen and methyl;
each $R^2$ is independently selected from $C_{1-10}$ alkanediyl, $C_{6-8}$ cycloalkanediyl, $C_{6-14}$ alkanecycloalkanediyl, and $-[(-CHR^3-)_s-X-]_q-(-CHR^3-)_r-$, wherein s, q, r, $R^3$, and X are as defined as for $R^1$;
m is an integer from 0 to 50;
n is an integer from 1 to 60; and
p is an integer from 2 to 6.

In certain embodiments, a Michael acceptor-terminated urethane-containing prepolymer is derived from the reaction of a thiol-terminated sulfur-containing adduct, a hydroxy vinyl ether, a diisocyanate, and 1,3-bis(vinylsulfonyl)-2-propanol ($HO-CH(-CH_2-S(O)_2-CH=CH_2)_2$), and optionally a polyfunctionalizing agent. Thus, in certain embodiments, a Michael acceptor-terminated urethane-containing prepolymer comprises the structure of Formula (8a), of Formula (8b), or a combination thereof.

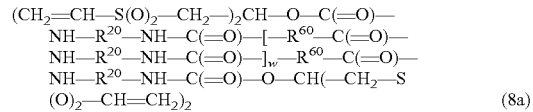  (8a)

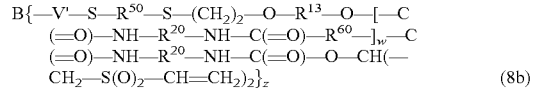  (8b)

where each $R^{13}$, each $R^{20}$, each $R^{50}$, each $R^{60}$, w, z, B, and each $-V'-$ are as defined herein. In certain embodiments of Formula (8a) and Formula (8b) each $R^{50}$ has the structure of Formula (5).

In certain embodiments, Michael acceptor-terminated urethane-containing prepolymers provided by the present disclosure comprise the reaction product of reactants comprising an isocyanate-terminated urethane-containing adduct, and a compound comprising a group reactive with an isocyanate and at least one Michael acceptor group. In certain embodiments, Michael acceptor-terminated urethane-containing prepolymers provided by the present disclosure comprise the reaction product of reactants comprising an isocyanate-terminated urethane-containing adduct, and a compound comprising a group reactive with an isocyanate; at least one Michael acceptor group; and at least one metal ligand.

In certain embodiments, a Michael acceptor-terminated urethane-containing prepolymer is terminated in two or more Michael acceptor groups. For example, each end of a linear prepolymer of Formula (6a) may be terminated in one or more Michael acceptor groups, and each arm of a multi-dentate prepolymer of Formula (6b) may be terminated in one or more Michael acceptor groups. In certain embodiments, an end or arm of a prepolymer may be terminated in 2, 3, or 4 Michael acceptor groups. For example, an arm of a tri-dentate prepolymer of Formula (6b) may be terminated with one Michael acceptor group, two Michael acceptor groups, or three Michael acceptor groups. Michael-acceptor-terminated urethane-containing prepolymers may comprise a mixture of Michael-acceptor-terminated urethane-containing prepolymers having different numbers of terminal Michael acceptor groups and therefore may be characterized by a non-integer Michael acceptor functionality. Linear and multi-dentate Michael-acceptor-terminated urethane-containing prepolymers having different numbers of Michael acceptor groups may be combined in different ratios to provide Michael-acceptor-terminated urethane-containing prepolymers characterized by a wide range of Michael acceptor functionality. Furthermore, in certain embodiments, at least some of the ends or arms of a Michael-acceptor-terminated urethane-containing prepolymer may be terminated in a single Michael acceptor group.

In certain embodiments, the isocyanate content of a Michael acceptor-terminated urethane-containing prepolymer is from 1% to 10%, from 2% to 6%, and in certain embodiments, from 3% to 5%.

In certain embodiments, a Michael acceptor-terminated urethane-containing prepolymer may be prepared by reacting an isocyanate-terminated urethane-containing adduct with a compound having at least one Michael acceptor group, and optionally a metal ligand group, and a group reactive with the isocyanate group such as a hydroxy group. The reaction can take place at a suitable temperature such as from 50° C. to 100° C., for a suitable time such as from 0.5 hours to 5 hours, in the presence of a suitable catalyst such as dibutyltin-dilaurate.

In certain embodiments, an isocyanate-terminated urethane-containing adduct comprises an isocyanate-terminated urethane-containing polythioether adduct, an isocyanate-terminated urethane-containing polysulfide adduct, or a combination of any of the foregoing.

In certain embodiments, Michael acceptor-terminated urethane-containing prepolymers provided by the present disclosure are capped with a moiety having a group reactive with an isocyanate and at least one Michael acceptor group. In certain embodiments, the capping moiety further includes a metal ligand.

Groups reactive with isocyanate groups include hydroxy groups, amine groups, and thiol groups.

Michael acceptor groups are well known in the art. In certain embodiments, a Michael acceptor group comprises an activated alkene, such as an alkenyl group proximate to an electron-withdrawing group such as an enone, nitro, halo, nitrile, carbonyl, or nitro group. In certain embodiments, a Michael acceptor group is selected from a vinyl ketone, a vinyl sulfone, a quinone, an enamine, a ketimine, an aldimine, and an oxazolidine. In certain embodiments, each of the Michael acceptor groups may be the same and in certain embodiments, at least some of the Michael acceptor groups are different.

In certain embodiments, a Michael acceptor group is a vinyl sulfone such as a divinyl sulfone.

In certain embodiments, each arm of a Michael acceptor-terminated urethane-containing prepolymer may be capped with from 1 to 4 Michael acceptor groups. In certain embodiments, each arm of a Michael acceptor-terminated urethane-containing prepolymer comprises one terminal Michael acceptor group. In certain embodiments, each arm of a Michael acceptor-terminated urethane-containing prepolymer is comprises two terminal Michael acceptor groups.

In certain embodiments of Formula (6a) and Formula (6b), each $R^{30}$ is derived from a bis(vinylsulfonyl)alkanol and has the structure of Formula (9):

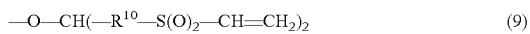

wherein each $R^{10}$ is $C_{1-3}$ alkanediyl.

In certain embodiments, a compound comprising a group reactive with an isocyanate and at least one Michael acceptor group comprises a bis(vinylsulfonyl)alkanol.

In certain embodiments, a compound comprises a hydroxy group and at least one Michael acceptor group.

In certain embodiments, Michael acceptor-terminated urethane-containing prepolymers provided by the present disclosure are capped with a compound having a group reactive with an isocyanate, at least one Michael acceptor group, and at least one metal ligand.

In certain embodiments, a metal ligand is capable of coordinating to an aerospace surface.

In certain embodiments, a compound comprises a hydroxy group and two vinyl sulfonyl groups.

Particularly convenient compounds that include two Michael acceptor groups, a metal ligand, and a hydroxy group are bis(vinylsulfonyl)alkanols. The terminal vinylsulfonyl groups are Michael acceptors, the bis(sulfonyl) groups serve as a metal ligand, and the hydroxy group can be reacted with the isocyanate groups of the isocyanate-terminated urethane-containing adduct.

In certain embodiments, a compound comprising a group reactive with an isocyanate, at least one Michael acceptor group, and at least one metal ligand, comprises a bis(vinylsulfonyl)alkanol, and in certain embodiments, 1,3-bis(vinylsulfonyl)-2-propanol.

In certain embodiments, Michael acceptor-terminated urethane-containing prepolymers provided by the present disclosure are terminated in a moiety comprising at least one Michael acceptor group and optionally at least one metal ligand and are bonded to isocyanate groups of the prepolymer via a urethane linkage.

Thus, in certain embodiments, a Michael acceptor/metal ligand containing compound comprises a reactive hydroxy group capable of reacting with terminal isocyanate groups of the isocyanate-terminated urethane-containing adduct precursor.

Previous work by the inventors demonstrated that the incorporation of metal ligands into the backbone of a sulfur-containing prepolymer and/or terminating a sulfur-containing prepolymer with a metal ligand can improve the adhesion of coatings and sealants to metal surfaces formed using metal ligand-containing prepolymers.

Bis(sulfonyl)alkanols represent one type of metal ligand that may be incorporated into the backbone of a polymer or form a terminal group such as a sulfur-containing prepolymer to improve surface adhesion. Other metal ligands may also be incorporated into the backbone of a polymer to enhance surface adhesion. In certain embodiments, such as for aerospace sealant applications, the metal ligands may be selected from a ligand capable of coordinating to aluminum, aluminum oxide, Al(III), anodized aluminum, titanium, titanium oxide, and/or Alodine® surfaces. The metal ligand may form a bidentate, tridentate, or higher order coordination complex to surface atoms.

Metal ligands and in particular aluminum (III) metal ligands include hard Lewis bases such as —OH, —PO$_4$, —SO$_4$, —COOH, —C=O, and —NH$_2$ groups, which are capable of donating electrons to vacant orbitals of the metal. Basic donor groups effective in forming multidentate coordination complexes with aluminum (III) include aliphatic monohydroxy acid anions, catecholates, aromatic hydroxy acid anions, 3-hydroxy-4-pyridinones, hydroxamates, and 3-hydroxy-2-pyridinones. Stable aluminum (III) complexes are with multidentate ligands having negative oxygen electron donors. A metal ligand may form a multidentate complex such as a bidentate complex or a tridentate complex with the metal.

In certain embodiments, a metal ligand functional group is derived from a metal chelating agent selected from a bis(sulfonyl)alkanol, a hydroxypyridinone, and an acetylacetonate.

Examples of aluminum, aluminum oxide and Al(III) chelating agents include 2,3-dihydroxybenzoic acid, 5-nitrosalicylate, 3-hydroxy-4-pyridinone, 3-hydroxy-2-pyridinone, 2-2'-dihyrdroxyazobenzene, 8-hydroxyquinoline, oxylate, malonate, citrate, inimodiacetic acid, picolinic acid, maltol, kojic acid, N,N'-diacetic acid (EDTA), N-(2-hydroxy) ethylenediamenetriacetic acid (HEDTA), ethylenediamine-N,N'-bis(2-hydroxyphenylacetic acid (EDDHA), and N,N'-bis(hydroxybenzyl)ethylenediamine-N,N'-diacetic acid (HBED), acetoacetate, acetylacetonate, a catecholate, a hydroxamate, and quinone. Other aluminum and aluminum oxide chelators are disclosed, for example, in Yokel, *Coordination Chemistry Reviews* 2002, 228, 97-113; and in Martell et al., *Coordination Chemistry Reviews* 1996, 149, 311-328.

Examples of titanium or titanium oxide metal ligands include H$_2$O$_2$, acetoacetonate (CH$_2$(COCH$_3$)$_2$), EDTA, trans-1,2-cyclohexanediamne tetraacetic acid, glycoletherdiamine tetracetic acid (GEDTA, (CH$_2$OCH$_2$CH$_2$N(CH$_2$COOH)$_2$)$_2$), diethylenetriamine pentaacetic acid (DTPA, HOOCH$_2$N(CH$_2$CH$_2$N(CH$_2$COOH)$_2$)$_2$), nitrile triacetic acid (NTA, N(CH$_2$COOH)$_3$), salicylic acid, lactic acid, acetoacetonate, triethanolamine, and combinations of any of the foregoing.

In certain embodiments, a metal ligand comprises at least two heteroatomic groups capable of coordinating to aluminum (III) surfaces. In certain embodiments, a metal ligand comprises at least two heteroatomic groups selected from —OH, —PO$_4$, —P(O)$_2$—, —SO$_4$, —S(O)$_2$—, —COOH, —C=O, —NH$_2$, —NH—, and a combination of any of the foregoing.

In certain embodiments, a metal ligand functional group comprises a moiety selected from Formula (10a), Formula (10b), Formula (10c), Formula (10d), Formula (10e), and a combination of any of the foregoing:

—X—(CH$_2$)$_s$—CH(—OH)—      (10a)

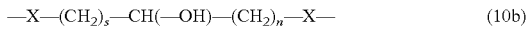

—X—(CH$_2$)$_s$—CH(—OH)—(CH$_2$)$_n$—X—      (10b)

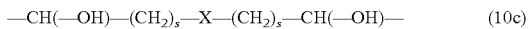

—CH(—OH)—(CH$_2$)$_s$—X—(CH$_2$)$_s$—CH(—OH)—      (10c)

—CH(—OH)—R$^5$—CH(—OH)—      (10d)

—C(O)—R$^5$—C(O)—      (10e)

wherein —X— is independently selected from —C(O)— or —S(O)$_2$—; each s is independently selected from 1, 2, and 3; and R$^5$ is a C$_{1-3}$ alkane-diyl. In certain embodiments, each X is —C(O)— and each s is 1; and in certain embodiments, each X is —S(O)$_2$— and each s is 1.

In certain embodiments, a metal ligand comprises a bis(sulfonyl)alkanol, a hydroxypyridinone, a quinone, an acetylacetonate, or a combination of any of the foregoing.

In certain embodiments, an isocyanate-terminated urethane-containing adduct comprises an isocyanate-terminated urethane-containing polythioether adduct, an isocyanate-terminated urethane-containing polysulfide adduct, or a combination thereof.

In certain embodiments, an isocyanate-terminated urethane-containing adduct comprises an isocyanate-terminated urethane-containing adduct of Formula (11a), an isocyanate-terminated urethane-containing adduct of Formula (11b), or a combination thereof:

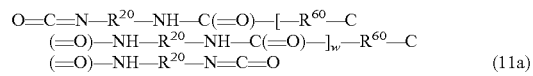

O=C=N—R$^{20}$—NH—C(=O)—[—R$^{60}$—C(=O)—NH—R$^{20}$—NH—C(=O)—]$_w$—R$^{60}$—C(=O)—NH—R$^{20}$—N=C=O      (11a)

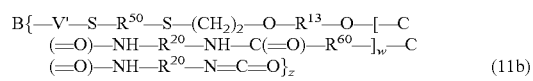

B{—V'—S—R$^{50}$—S—(CH$_2$)$_2$—O—R$^{13}$—O—[—C(=O)—NH—R$^{20}$—NH—C(=O)—R$^{60}$—]$_w$—C(=O)—NH—R$^{20}$—N=C=O}$_z$      (11b)

wherein,
w is an integer from 1 to 100;
each R$^{13}$ independently comprises C$_{2-10}$ alkanediyl;
each R$^{20}$ independently comprises a core of a diisocyanate;
each R$^{30}$ independently comprises at least one terminal Michael acceptor group;
each R$^{50}$ independently comprises a core of a sulfur-containing prepolymer;
each R$^{60}$ independently comprises a moiety having the structure of Formula (7):

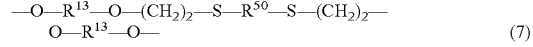

—O—R$^{13}$—O—(CH$_2$)$_2$—S—R$^{50}$—S—(CH$_2$)$_2$—O—R$^{13}$—O—      (7)

B represents a core of a z-valent, polyfunctionalizing agent B(—V)$_z$ wherein,
z is an integer from 3 to 6; and
each V is a moiety comprising a terminal group reactive with a thiol group; and
each —V'— is derived from the reaction of —V with a thiol.

In certain embodiments of Formula (11a) and (11b), each R$^{50}$ is derived from a polythioether. For example, in certain embodiments, each R$^{50}$ has the structure of Formula (5):

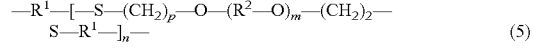

—R$^1$—[—S—(CH$_2$)$_p$—O—(R$^2$—O)$_m$—(CH$_2$)$_2$—S—R$^1$—]$_n$—      (5)

wherein,
each R$^1$ independently is selected from C$_{2-10}$ alkanediyl, C$_{6-8}$ cycloalkanediyl, C$_{6-14}$ alkanecycloalkanediyl, C$_{5-8}$ heterocycloalkanediyl, and —[(—CHR$^3$—)$_s$—X—]$_q$—(—CHR$^3$—)$_r$—, wherein,
s is an integer from 2 to 6;
q is an integer from 1 to 5;
r is an integer from 2 to 10;
each R$^3$ is independently selected from hydrogen and methyl; and
each X is independently selected from —O—, —S—, and —NR—, wherein R is selected from hydrogen and methyl;
each R$^2$ is independently selected from C$_{1-10}$ alkanediyl, C$_{6-8}$ cycloalkanediyl, C$_{6-14}$ alkanecycloalkanediyl, and —[(—CHR$^3$—)$_s$—X—]$_q$—(—CHR$^3$—)$_r$—, wherein s, q, r, R$^3$, and X are as defined as for R$^1$;

m is an integer from 0 to 50;
n is an integer from 1 to 60; and
p is an integer from 2 to 6.

In certain embodiments of Formula (11a) and (11b), w is an integer from 2-50, and in certain embodiments from 2-20.

In certain embodiments, an isocyanate-terminated urethane-containing adduct comprises the reaction product of reactants comprising a hydroxy-terminated sulfur-containing adduct and a diisocyanate.

In certain embodiments, a hydroxy-terminated sulfur-containing adduct and a diisocyanate are reacted in a molar ratio such that the isocyanate-terminated urethane-containing adduct comprises alternating units of a sulfur-containing moiety and a diisocyanate. In certain embodiments, an isocyanate-terminated urethane-containing adduct comprises the reaction product of reactants comprising hydroxy-terminated Permapol® 3.1E and a diisocyanate such as a cycloaliphatic diisocyanate.

In certain embodiments, the isocyanate content of the isocyanate-terminated urethane-containing prepolymer is from 1% to 10%, from 2% to 6%, and in certain embodiments, from 3% to 5%.

Isocyanate-terminated urethane-containing adducts may be synthesized by reacting, for example, a diisocyanate with an appropriately terminated sulfur-containing adduct such as, for example, a hydroxy-terminated sulfur-containing adduct, at a suitable temperature such as from 50° C. to 100° C. for a suitable time such as from 1 hour to 4 hours, in the presence of a tin catalyst, such as dibutyltin dilaurate. Those skilled in the art can determine appropriate reaction conditions.

In certain embodiments, sulfur-containing adducts provided by the present disclosure comprise terminal hydroxy groups that are reactive with isocyanate groups and may be reacted directly with a polyisocyanate such as a diisocyanate to provide isocyanate-terminated urethane-containing adducts useful in forming Michael acceptor-terminated urethane-containing prepolymers provided by the present disclosure.

In certain embodiments, a sulfur-containing adduct may be functionalized to provide groups sufficiently reactive with isocyanate groups. For example, in certain embodiments, thiol-terminated sulfur-containing adducts provide suitable precursors to form Michael acceptor-terminated urethane-containing prepolymers of the present disclosure. To render a thiol-terminated sulfur-containing prepolymers reactive with isocyanate groups the thiol-terminated sulfur-containing prepolymers may be functionalized with hydroxy groups. In certain embodiments, a thiol-terminated sulfur-containing adduct can be reacted with a compound having a group reactive with an alkenyl group and a hydroxy group. Examples of such compounds include hydroxy vinyl ethers.

In certain embodiments, a hydroxy-terminated sulfur-containing adduct comprises a hydroxy-terminated polythioether adduct, such as a hydroxy-terminated polythioether adduct of Formula (12a), a hydroxy-terminated polythioether adduct of Formula (12b), or a combination thereof.

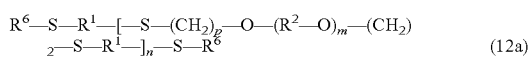
(12a)

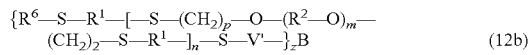
(12b)

where $R^1$, $R^2$, m, n, and p are defined herein, and each $R^6$ is a moiety comprising a terminal hydroxy group.

In certain embodiments, each $R^6$ is derived from a hydroxy vinyl ether and has the structure of Formula (13):

(13)

where $R^{13}$ is $C_{2-10}$ alkanediyl. In certain embodiments, $R^{13}$ is $-(CH_2)_4-$.

Isocyanate-terminated urethane-containing adducts can be prepared by reacting a polyisocyanate with a sulfur-containing adduct comprising terminal groups reactive with isocyanate groups such as terminal hydroxy groups. A polyisocyanate can be difunctional, n-functional where n is an integer from 3 to 6, or a combination of any of the foregoing. In certain embodiments, a polyisocyanate is difunctional and is referred to as a diisocyanate. A diisocyanate may be aliphatic, alicyclic or aromatic.

Examples of suitable aliphatic diisocyanates include, 1,6-hexamethylene diisocyanate, 1,5-diisocyanato-2-methylpentane, methyl-2,6-diisocyanatohexanoate, bis(isocyanatomethyl)cyclohexane, 1,3-bis(isocyanatomethyl)cyclohexane, 2,2,4-trimethylhexane 1,6-diisocyanate, 2,4,4-trimethylhexane 1,6-diisocyanate, 2,5(6)-bis(isocyanatomethyl)cyclo[2.2.1.]heptane, 1,3,3-trimethyl-1-(isocyanatomethyl)-5-isocyanatocyclohexane, 1,8-diisocyanato-2,4-dimethyloctane, octahydro-4,7-methano-1H-indenedimethyl diisocyanate, and 1,1'-methylenebis(4-isocyanatocyclohexane), and 4,4-methylene dicyclohexyl diisocyanate) (H12MDI). Examples of suitable aromatic diisocyanates include 1,3-phenylene diisocyanate, 1,4-phenylene diisocyanate, 2,6-toluene diisocyanate (2,6-TDI), 2,4-toluene diisocyanate (2,4-TDI), a blend of 2,4-TDI and 2,6-TDI, 1,5-diisocyanatonaphthalene, diphenyl oxide 4,4'-diisocyanate, 4,4'-methylenediphenyl diisocyanate (4,4-MDI), 2,4'-methylenediphenyl diisocyanate (2,4-MDI), 2,2'-diisocyanatodiphenylmethane (2,2-MDI), diphenylmethane diisocyanate (MDI), 3,3'-dimethyl-4,4'-biphenylene isocyanate, 3,3'-dimethoxy-4,4'-biphenylene diisocyanate, 1-[(2,4-diisocyanatophenyl)methyl)methyl]-3-isocyanato-2-methyl benzene, and 2,4,6-triisopropyl-m-phenylene diisocyanate.

Examples of suitable alicyclic diisocyanates from which the diisocyanates may be selected include isophorone diisocyanate, cyclohexane diisocyanate, methylcyclohexane diisocyanate, bis(isocyanatomethyl)cyclohexane, bis(isocyanatocyclohexyl)methane, bis(isocyanatocyclohexyl)-2,2-propane, bis(isocyanatocyclohexyl)-1,2-ethane, 2-isocyanatomethyl-3-(3-isocyanatopropyl)-5-isocyanatomethyl-bicyclo[2.2.1]-heptane, 2-isocyanatomethyl-3-(3-isocyanatopropyl)-6-isocyanatomethyl-bicyclo[2.2.1]-heptane, 2-isocyanatomethyl-2-(3-isocyanatopropyl)-5-isocyanatomethyl-bicyclo[2.2.1]-heptane, 2-isocyanatomethyl-2-(3-isocyanatopropyl)-6-isocyanatomethyl-bicyclo[2.2.1]-heptane, 2-isocyanatomethyl-3-(3-isocyanatopropyl)-6-(2-isocyanatoethyl)-bicyclo[2.2.1]-heptane, 2-isocyanatomethyl-2-(3-isocyanatopropyl)-5-(2-isocyanatoethyl)-bicyclo[2.2.1]-heptane, and 2-isocyanatomethyl-2-(3-isocyanatopropyl)-6-(2-isocyanatoethyl)-bicyclo[2.2.1]-heptane.

Examples of suitable aromatic diisocyanates in which the isocyanate groups are not bonded directly to the aromatic ring include, but are not limited to, bis(isocyanatoethyl)benzene, a, a, α',α'-tetramethylxylene diisocyanate, 1,3-bis(1-isocyanato-1-methylethyl)benzene, bis(isocyanatobutyl)benzene, bis(isocyanatomethyl)naphthalene, bis(isocyanatomethyl)diphenyl ether, bis(isocyanatoethyl)phthalate, and 2,5-di(isocyanatomethyl)furan. Aromatic diisocyanates having isocyanate groups bonded directly to the aromatic ring include phenylene diisocyanate, ethylphenylene diisocyanate, isopropylphenylene diisocyanate, dimethylphenylene diisocyanate, diethylphenylene diisocyanate, diisopropylphenylene diisocyanate, naphthalene diisocyanate, methylnaphthalene diisocyanate, biphenyl diisocyanate, 4,4'-diphenylmethane diisocyanate, bis(3-methyl-4-isocyanatophenyl)methane, bis (isocyanatophenyl)ethylene, 3,3'-dimethoxy-biphenyl-4,4'-diisocyanate, diphenylether diisocyanate, bis(isocyanatophenylether)ethyleneglycol, bis(isocyanatophenylether)-1,3-propyleneglycol, benzophenone diisocyanate, carbazole diisocyanate, ethylcarbazole diisocyanate, dichlorocarbazole diisocyanate, 4,4'-diphenylmethane diisocyanate, p-phenylene diisocyanate, 2,4-toluene diisocyanate, and 2,6-toluene diisocyanate.

Other examples of suitable diisocyanates include 1,3-phenylene diisocyanate, 1,4-phenylene diisocyanate, 2,6-toluene diisocyanate (2,6-TDI), 2,4-toluene diisocyanate (2,4-TDI), a blend of 2,4-TDI and 2,6-TDI, 1,5-diisocyanato naphthalene, diphenyl oxide 4,4'-diisocyanate, 4,4'-methylenediphenyl diisocyanate (4,4-MDI), 2,4'-methylenediphenyl diisocyanate (2,4-MDI), 2,2'-diisocyanatodiphenylmethane (2,2-MDI), diphenylmethane diisocyanate (MDI), 3,3'-dimethyl-4,4'-biphenylene isocyanate, 3,3'-dimethoxy-4,4'-biphenylene diisocyanate, 1-[(2,4-diisocyanatophenyl)methyl]-3-isocyanato-2-methyl benzene, 2,4,6-triisopropyl-m-phenylene diisocyanate, 4,4-methylene dicyclohexyl diisocyanate (H12MDI), and a combination of any of the foregoing.

Additional examples of suitable aromatic diisocyanates include 1,3-phenylene diisocyanate, 1,4-phenylene diisocyanate, 2,6-toluene diisocyanate (2,6-TDI), 2,4-toluene diisocyanate (2,4-TDI), a blend of 2,4-TDI and 2,6-TDI, 1,5-diisocyanato naphthalene, diphenyl oxide 4,4'-diisocyanate, 4,4'-methylenediphenyl diisocyanate (4,4-MDI), 2,4'-methylenediphenyl diisocyanate (2,4-MDI), 2,2'-diisocyanatodiphenylmethane (2,2-MDI), diphenylmethane diisocyanate (MDI), 3,3'-dimethyl-4,4'-biphenylene isocyanate, 3,3'-dimethoxy-4,4'-biphenylene diisocyanate, 1-[(2,4-diisocyanatophenyl)methyl]-3-isocyanato-2-methyl benzene, and 2,4,6-triisopropyl-m-phenylene diisocyanate.

Isocyanate-terminated urethane-containing adducts may be prepared, for example, by reacting a hydroxy-terminated sulfur-containing adduct, such as the hydroxy-terminated polythioethers of Formula (12a) and Formula (12b) with a compound having a terminal isocyanate group and a group that is reactive with the terminal hydroxy groups of the polythioethers of Formula (12a) and Formula (12b), such as a diisocyanate.

In certain embodiments, isocyanate-terminated urethane-containing polythioether adducts may be prepared, for example, by reacting a hydroxy-terminated polythioether adduct of Formula (12a) or Formula (12b) with a diisocyanate such as TDI, Isonate™ 143L (polycarbodiimide-modified diphenylmethene diisocyanate), Desmodur® N3400 (1,3-diazetidine-2,4-dione, 1,3-bis(6-isocyanatohexyl)-), IDPI (isophorone diisocyanate), or Desmodur® W (H12MDI) optionally in the presence of a catalyst such as dibutyltin dilaurate in an organic solvent such as benzoyl chloride at a temperature from about 70° C. to about 80° C. to provide the corresponding isocyanate-terminated urethane-containing polythioether adduct of Formula (6a), (6b), (8a), and (8b).

In certain embodiments, the moiety —C(=O)—NH—$R^{20}$—NH—C(=O)— can be derived from a diisocyanate of Formula (14):

$$O=C=N-R^{20}-N=C=O \qquad (14)$$

In certain embodiments, a hydroxy-terminated sulfur-containing adduct comprises a reaction product of reactants comprising a thiol-terminated sulfur-containing adduct and a hydroxy vinyl ether.

In certain embodiments, a thiol-terminated sulfur-containing adduct comprises a thiol-terminated polythioether adduct, a thiol-terminated polysulfide adduct, or a combination thereof.

In certain embodiments, a thiol-terminated sulfur-containing adduct comprises a thiol-terminated polythioether adduct. Examples of thiol-functional polythioether adducts are disclosed, for example, in U.S. Pat. No. 6,172,179. In certain embodiments, a thiol-functional polythioether adduct comprises Permapol® P3.1E, available from PRC-DeSoto International Inc., Sylmar, Calif.

In certain embodiments, a thiol-terminated sulfur-containing adduct comprises a thiol-terminated polythioether selected from a thiol-terminated polythioether adduct of Formula (15a), a thiol-terminated polythioether adduct of Formula (15b), and a combination thereof:

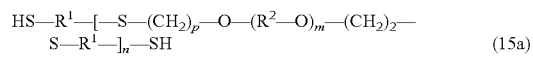
$$HS—R^1—[—S—(CH_2)_p—O—(R^2—O)_m—(CH_2)_2—S—R^1—]_n—SH \qquad (15a)$$

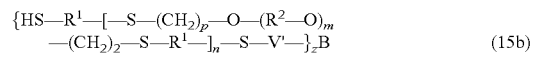
$$\{HS—R^1—[—S—(CH_2)_p—O—(R^2—O)_m—(CH_2)_2—S—R^1—]_n—S—V'—\}_zB \qquad (15b)$$

wherein, each $R^1$ independently is selected from $C_{2-10}$ alkanediyl, $C_{6-8}$ cycloalkanediyl, $C_{6-14}$ alkanecycloalkanediyl, $C_{5-8}$ heterocycloalkanediyl, and —[(—CHR$^3$—)$_s$—X—]$_q$—(—CHR$^3$—)$_r$—, wherein, s is an integer from 2 to 6;

q is an integer from 1 to 5;

r is an integer from 2 to 10;

each $R^3$ is independently selected from hydrogen and methyl; and each X is independently selected from —O—, —S—, and —NR—, wherein R is selected from hydrogen and methyl;

each $R^2$ is independently selected from $C_{1-10}$ alkanediyl, $C_{6-8}$ cycloalkanediyl, $C_{6-14}$ alkanecycloalkanediyl, and —[(—CHR$^3$—)$_s$—X—]$_q$—(—CHR$^3$—)$_r$—, wherein s, q, r, $R^3$, and X are as defined as for $R^1$;

m is an integer from 0 to 50;

n is an integer from 1 to 60;

p is an integer from 2 to 6;

B represents a core of a z-valent, polyfunctionalizing agent B(—V)$_z$ wherein, z is an integer from 3 to 6; and each V is a moiety comprising a terminal group reactive with a thiol; and each —V'— is derived from the reaction of —V with a thiol.

In certain embodiments, Formula (15a) and in Formula (15b), $R^1$ is —[(—CH$_2$—)$_p$—X—]$_q$—(CH$_2$)$_r$—, where p is 2, X is —O—, q is 2, r is 2, $R^2$ is ethanediyl, m is 2, and n is 9.

In certain embodiments of Formula (15a) and Formula (15b), $R^1$ is selected from $C_{2-6}$ alkanediyl and —[—(CHR$^3$)$_s$—X—]$_q$—(CHR$^3$)$_r$—.

In certain embodiments of Formula (15a) and Formula (15b), $R^1$ is —[—(CHR$^3$)$_s$—X—]$_q$—(CHR$^3$)$_r$—, and in certain embodiments X is —O— and in certain embodiments, X is —S—.

In certain embodiments of Formula (15a) and Formula (15b), where $R^1$ is —[—(CHR$^3$)$_s$—X—]$_q$—(CHR$^3$)$_r$—, p is 2, r is 2, q is 1, and X is —S—; in certain embodiments, wherein p is 2, q is 2, r is 2, and X is —O—; and in certain embodiments, p is 2, r is 2, q is 1, and X is —O—.

In certain embodiments of Formula (15a and Formula (15b), where $R^1$ is —[—$(CHR^3)_s$—X—$]_q$—$(CHR^3)_r$—, each $R^3$ is hydrogen, and in certain embodiments, at least one $R^3$ is methyl.

In certain embodiments of Formula (15a) and Formula (15b), each $R^1$ is the same, and in certain embodiments, at least one $R^1$ is different.

Various methods can be used to prepare thiol-terminated polythioethers of Formula (15a) and Formula (15b). Examples of suitable thiol-terminated polythioethers, and methods for their production, are described in U.S. Pat. No. 6,172,179 at col. 2, line 29 to col. 4, line 22; col. 6, line 39 to col. 10, line 50; and col. 11, lines 65 to col. 12, line 22, the cited portions of which are incorporated by reference. Such thiol-terminated polythioethers may be difunctional, that is, linear polymers having two terminal thiol groups, or polyfunctional, that is, branched polymers have three or more terminal thiol groups. Suitable thiol-terminated polythioethers are commercially available, for example, as Permapol® P3.1E, from PRC-DeSoto International Inc., Sylmar, Calif.

In certain embodiments, a thiol-terminated sulfur-containing polymer comprises a polythioether. A sulfur-containing polymer may comprise a mixture of different polythioethers and the polythioethers may have the same or different functionality. In certain embodiments, a sulfur-containing polymer has an average functionality from 2 to 6, from 2 to 4, from 2 to 3, and in certain embodiments, from 2.05 to 2.5. For example, a sulfur-containing polymer can be selected from a difunctional sulfur-containing polymer, a trifunctional sulfur-containing polymer, and a combination thereof.

In certain embodiments, a thiol-terminated polythioether can be prepared by reacting a polythiol and a diene such as a divinyl ether, and the respective amounts of the reactants used to prepare the polythioethers are chosen to yield terminal thiol groups. Thus, in some cases, (n or >n, such as n+1) moles of a polythiol, such as a dithiol or a mixture of at least two different dithiols and about 0.05 moles to 1 moles, such as 0.1 moles to 0.8 moles, of a thiol-terminated polyfunctionalizing agent may be reacted with (n) moles of a diene, such as a divinyl ether, or a mixture of at least two different dienes, such as a divinyl ether. In certain embodiments, a thiol-terminated polyfunctionalizing agent is present in the reaction mixture in an amount sufficient to provide a thiol-terminated polythioether having an average functionality of from 2.05 to 3, such as 2.1 to 2.8.

The reaction used to make a thiol-terminated polythioether may be catalyzed by a free radical catalyst. Suitable free radical catalysts include azo compounds, for example azobisnitrile compounds such as azo(bis)isobutyronitrile (AIBN); organic peroxides, such as benzoyl peroxide and t-butyl peroxide; and inorganic peroxides, such as hydrogen peroxide. The reaction can also be effected by irradiation with ultraviolet light either with or without a radical initiator/photosensitizer. Ionic catalysis methods, using either inorganic or organic bases, e.g., triethylamine, may also be used.

Suitable thiol-terminated polythioethers may be produced by reacting a divinyl ether or mixtures of divinyl ethers with an excess of dithiol or a mixtures of dithiols.

Thus, in certain embodiments, a thiol-terminated polythioether comprises the reaction product of reactants comprising:

(a) a dithiol of Formula (16):

$$\text{HS—R}^1\text{—SH} \quad (16)$$

wherein,
$R^1$ is selected from $C_{2-6}$ alkanediyl, $C_{6-8}$ cycloalkanediyl, $C_{6-10}$ alkanecycloalkanediyl, $C_{5-8}$ heterocycloalkanediyl, and —[—$(CHR^3)_s$—X—$]_q$—$(CHR^3)_r$—;

wherein,
each $R^3$ is independently selected from hydrogen and methyl;
each X is independently selected from —O—, —S—, —NH—, and —NR— wherein R is selected from hydrogen and methyl;
s is an integer from 2 to 6;
q is an integer from 1 to 5; and
r is an integer from 2 to 10; and (b) a divinyl ether of Formula (17):

$$\text{CH}_2\text{=CH—O—[—R}^2\text{—O—]}_m\text{—CH=CH}_2 \quad (17)$$

wherein,
each $R^2$ is independently selected from $C_{1-10}$ alkanediyl, $C_{6-8}$ cycloalkanediyl, $C_{6-14}$ alkanecycloalkanediyl, and —[(—$CHR^3$—)$_s$—X—$]_q$—(—$CHR^3$—)$_r$—, wherein s, q, r, $R^3$, and X are as defined above;
m is an integer from 0 to 50;
n is an integer from 1 to 60; and
p is an integer from 2 to 6.

And, in certain embodiments, the reactants may comprise (c) a polyfunctional compound such as a polyfunctional compound B(—V)$_z$, where B, —V, and z are as defined herein.

In certain embodiments, dithiols suitable for use in preparing thiol-terminated polythioethers include those having Formula (16), other dithiols disclosed herein, or combinations of any of the dithiols disclosed herein. In certain embodiments, a dithiol has the structure of Formula (16):

$$\text{HS—R}^1\text{—SH} \quad (16)$$

wherein,
$R^1$ is selected from $C_{2-6}$ alkanediyl, $C_{6-8}$ cycloalkanediyl, $C_{6-10}$ alkanecycloalkanediyl, $C_{5-8}$ heterocycloalkanediyl, and —[—$(CHR^3)_s$—X—$]_q$—$(CHR^3)_r$;
wherein,
each $R^3$ is independently selected from hydrogen and methyl;
each X is independently selected from —O—, —S—, and —NR— wherein R is selected from hydrogen and methyl;
s is an integer from 2 to 6;
q is an integer from 1 to 5; and
r is an integer from 2 to 10.

In certain embodiments of a dithiol of Formula (16), $R^1$ is —[—$(CHR^3)_s$—X—$]_q$—$(CHR^3)_r$—.

In certain embodiments of a compound of Formula (16), X is selected from —O— and —S—, and thus —[—$(CHR^3)_s$—X—$]_q$—$(CHR^3)_r$— in Formula (16) is —[(—$CHR^3$—)$_s$—O—$]_q$—$(CHR^3)_r$— or —[(—$CHR^3{}_2$—)$_s$—S—$]_q$—$(CHR^3)_r$—. In certain embodiments, p and r are equal, such as where p and r are both two.

In certain embodiments of a dithiol of Formula (16), $R^1$ is selected from $C_{2-6}$ alkanediyl and —[—$(CHR^3)_s$—X—$]_q$—$(CHR^3)_r$—.

In certain embodiments of a dithiol of Formula (16), $R^1$ is —[—$(CHR^3)_s$—X—$]_q$—$(CHR^3)_r$—, and in certain embodiments X is —O—, and in certain embodiments, X is —S—.

In certain embodiments where $R^1$ is —[—$(CHR^3)_s$—X—$]_q$—$(CHR^3)_r$—, s is 2, r is 2, q is 1, and X is —S—; in certain embodiments, wherein s is 2, q is 2, r is 2, and X is —O—; and in certain embodiments, s is 2, r is 2, q is 1, and X is —O—.

In certain embodiments where $R^1$ is —[—(CHR$^3$)$_s$—X—]$_q$—(CHR$^3$)$_r$—, each $R^3$ is hydrogen, and in certain embodiments, at least one $R^3$ is methyl.

In certain embodiments of Formula (16), each $R^1$ is derived from dimercaptodioxaoctane (DMDO) and in certain embodiments, each $R^1$ is derived from dimercaptodiethylsulfide (DMDS).

In certain embodiments of Formula (16), each m is independently an integer from 1 to 3. In certain embodiments, each m is the same and is 1, 2, and in certain embodiments, 3.

In certain embodiments of Formula (16), n is an integer from 1 to 30, an integer from 1 to 20, an integer from 1 to 10, and in certain embodiments, and an integer from 1 to 5. In addition, in certain embodiments, n may be any integer from 1 to 60.

In certain embodiments of Formula (16), each p is independently selected from 2, 3, 4, 5, and 6. In certain embodiments, each p is the same and is 2, 3, 4, 5, or 6.

Examples of suitable dithiols include, for example, 1,2-ethanedithiol, 1,2-propanedithiol, 1,3-propanedithiol, 1,3-butanedithiol, 1,4-butanedithiol, 2,3-butanedithiol, 1,3-pentanedithiol, 1,5-pentanedithiol, 1,6-hexanedithiol, 1,3-dimercapto-3-methylbutane, dipentenedimercaptan, ethylcyclohexyldithiol (ECHDT), dimercaptodiethylsulfide, methyl-substituted dimercaptodiethylsulfide, dimethyl-substituted dimercaptodiethylsulfide, dimercaptodioxaoctane, 1,5-dimercapto-3-oxapentane, and a combination of any of the foregoing. A polythiol may have one or more pendant groups selected from a lower (e.g., $C_{1-6}$) alkyl group, a lower alkoxy group, and a hydroxy group. Suitable alkyl pendant groups include, for example, $C_{1-6}$ linear alkyl, $C_{3-6}$ branched alkyl, cyclopentyl, and cyclohexyl.

Other examples of suitable dithiols include dimercaptodiethylsulfide (DMDS) (in Formula (16), $R^1$ is —[(—CH$_2$—)$_s$—X—]$_q$—(CH$_2$)$_r$—, wherein s is 2, r is 2, q is 1, and X is —S—); dimercaptodioxaoctane (DMDO) (in Formula (16), $R^1$ is —[(—CH$_2$—)$_s$—X—]$_q$—(CH$_2$)$_r$—, wherein s is 2, q is 2, r is 2, and X is —O—); and 1,5-dimercapto-3-oxapentane (in Formula (16), $R^1$ is —[(—CH$_2$—)$_s$—X—]$_q$—(CH$_2$)$_r$—, wherein s is 2, r is 2, q is 1, and X is —O—). It is also possible to use dithiols that include both heteroatoms in the carbon backbone and pendant alkyl groups, such as methyl groups. Such compounds include, for example, methyl-substituted DMDS, such as HS—CH$_2$CH(CH$_3$)—S—CH$_2$CH$_2$—SH, HS—CH(CH$_3$)CH$_2$—S—CH$_2$CH$_2$—SH and dimethyl substituted DMDS, such as HS—CH$_2$CH(CH$_3$)—S—CHCH$_3$CH$_2$—SH and HS—CH(CH$_3$)CH$_2$—S—CH$_2$CH(CH$_3$)—SH.

Suitable divinyl ethers for preparing polythioethers include, for example, divinyl ethers of Formula (17):

$$CH_2=CH-O-(-R^2-O-)_m-CH=CH_2 \quad (17)$$

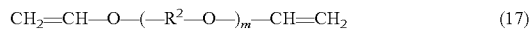

where $R^2$ in Formula (17) is selected from a $C_{2-6}$ n-alkanediyl group, a $C_{3-6}$ branched alkanediyl group, a $C_{6-8}$ cycloalkanediyl group, a $C_{6-10}$ alkanecycloalkanediyl group, and —[(—CH$_2$—)$_s$—O—]$_q$—(—CH$_2$—)$_r$—, where s is an integer ranging from 2 to 6, q is an integer from 1 to 5, and r is an integer from 2 to 10. In certain embodiments of a divinyl ether of Formula (17), $R^2$ is a $C_{2-6}$ n-alkanediyl group, a $C_{3-6}$ branched alkanediyl group, a $C_{6-8}$ cycloalkanediyl group, a $C_{6-10}$ alkanecycloalkanediyl group, and in certain embodiments, —[(—CH$_2$—)$_s$—O—]$_q$—(—CH$_2$—)$_r$—.

Suitable divinyl ethers include, for example, compounds having at least one oxyalkanediyl group, such as from 1 to 4 oxyalkanediyl groups, i.e., compounds in which m in Formula (17) is an integer ranging from 1 to 4. In certain embodiments, m in Formula (17) is an integer ranging from 2 to 4. It is also possible to employ commercially available divinyl ether mixtures that are characterized by a non-integral average value for the number of oxyalkanediyl units per molecule. Thus, m in Formula (17) can also take on rational number values ranging from 0 to 10.0, such as from 1.0 to 10.0, from 1.0 to 4.0, or from 2.0 to 4.0.

Examples of suitable vinyl ethers include, divinyl ether, ethylene glycol divinyl ether (EG-DVE) ($R^2$ in Formula (17) is ethanediyl and m is 1), butanediol divinyl ether (BD-DVE) ($R^2$ in Formula (17) is butanediyl and m is 1), hexanediol divinyl ether (HD-DVE) ($R^2$ in Formula (17) is hexanediyl and m is 1), diethylene glycol divinyl ether (DEG-DVE) ($R^2$ in Formula (17) is ethanediyl and m is 2), triethylene glycol divinyl ether ($R^2$ in Formula (17) is ethanediyl and m is 3), tetraethylene glycol divinyl ether ($R^2$ in Formula (17) is ethanediyl and m is 4), cyclohexanedimethanol divinyl ether, polytetrahydrofuryl divinyl ether; trivinyl ether monomers, such as trimethylolpropane trivinyl ether; tetrafunctional ether monomers, such as pentaerythritol tetravinyl ether; and combinations of two or more such polyvinyl ether monomers. A polyvinyl ether may have one or more pendant groups selected from alkyl groups, hydroxy groups, alkoxy groups, and amine groups.

In certain embodiments, divinyl ethers in which $R^2$ in Formula (17) is $C_{3-6}$ branched alkanediyl may be prepared by reacting a polyhydroxy compound with acetylene. Examples of divinyl ethers of this type include compounds in which $R^2$ in Formula (17) is an alkyl-substituted methanediyl group such as —CH(—CH$_3$)—, for which $R^2$ in Formula (17) is ethanediyl and m is 3 or an alkyl-substituted ethanediyl.

Other useful divinyl ethers include compounds in which $R^2$ in Formula (17) is polytetrahydrofuryl (poly-THF) or polyoxyalkanediyl, such as those having an average of about 3 monomer units.

Two or more types of polyvinyl ether monomers of Formula (17) may be used. Thus, in certain embodiments, two dithiols of Formula (16) and one polyvinyl ether monomer of Formula (17), one dithiol of Formula (16) and two polyvinyl ether monomers of Formula (17), two dithiols of Formula (16) and two divinyl ether monomers of Formula (17), and more than two compounds of one or both Formula (16) and Formula (17), may be used to produce a variety of thiol-terminated polythioethers.

In certain embodiments, a polyvinyl ether monomer comprises 20 to less than 50 mole percent of the reactants used to prepare a thiol-terminated polythioether, and in certain embodiments, 30 to less than 50 mole percent.

In certain embodiments provided by the present disclosure, relative amounts of dithiols and divinyl ethers are selected to yield polythioethers having terminal thiol groups. Thus, a dithiol of Formula (16) or a mixture of at least two different dithiols of Formula (16), can be reacted with of a divinyl ether of Formula (17) or a mixture of at least two different divinyl ethers of Formula (17) in relative amounts such that the molar ratio of thiol groups to alkenyl groups is greater than 1:1, such as from 1.1 to 2.0:1.0.

The reaction between dithiols and divinyl ethers and/or polythiols and polyvinyl ethers may be catalyzed by a free radical catalyst. Suitable free radical catalysts include, for example, azo compounds, for example azobisnitriles such as azo(bis)isobutyronitrile (AIBN); organic peroxides such as benzoyl peroxide and t-butyl peroxide; and inorganic peroxides such as hydrogen peroxide. The catalyst may be a free-radical catalyst, an ionic catalyst, or ultraviolet radiation. In certain embodiments, the catalyst does not comprise acidic or basic compounds, and does not produce acidic or basic compounds upon decomposition. Examples of free-radical catalysts include azo-type catalyst, such as Vazo®-57 (Du Pont), Vazo®-64 (Du Pont), Vazo®-67 (Du Pont), V-70® (Wako Specialty Chemicals), and V-65B® (Wako Specialty Chemicals). Examples of other free-radical catalysts are alkyl peroxides, such as t-butyl peroxide. The reaction may also be effected by irradiation with ultraviolet light either with or without a cationic photoinitiating moiety.

Thiol-terminated polythioethers provided by the present disclosure may be prepared by combining at least one dithiol of Formula (16) and at least one divinyl ether of Formula (17) followed by addition of an appropriate catalyst, and carrying out the reaction at a temperature from 30° C. to 120° C., such as 70° C. to 90° C., for a time from 2 hours to 24 hours, such as 2 hours to 6 hours.

As disclosed herein, thiol-terminated polythioethers may comprise a polyfunctional polythioether, i.e., may have an average functionality of greater than 2.0. Suitable polyfunctional thiol-terminated polythioethers include, for example, those having the structure of Formula (18):

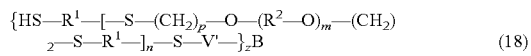

$\{HS-R^1-[-S-(CH_2)_p-O-(R^2-O)_m-(CH_2)_2-S-R^1-]_n-S-V'-\}_zB$ (18)

wherein z has an average value of greater than 2.0, and, in certain embodiments, a value between 2 and 3, a value between 2 and 4, a value between 3 and 6, and in certain embodiments, is an integer from 3 to 6.

Polyfunctionalizing agents suitable for use in preparing such polyfunctional thiol-terminated polymers include trifunctionalizing agents, that is, compounds where z is 3. Suitable trifunctionalizing agents include, for example, triallyl cyanurate (TAC), 1,2,3-propanetrithiol, isocyanurate-containing trithiols, and combinations thereof, as disclosed in U.S. Publication No. 2010/0010133 at paragraphs [0102]-[0105], the cited portion of which is incorporated by reference and isocyanurates as disclosed, for example, in U.S. Application Publication No. 2011/0319559, which is incorporated by reference in its entirety. Other useful polyfunctionalizing agents include trimethylolpropane trivinyl ether, and the polythiols described in U.S. Pat. Nos. 4,366,307; 4,609,762; and 5,225,472, each of which is incorporated by reference in its entirety. Mixtures of polyfunctionalizing agents may also be used. As a result, polythioethers provided by the present disclosure may have a wide range of average functionality. For example, trifunctionalizing agents may afford average functionalities from 2.05 to 3.0, such as from 2.1 to 2.6. Wider ranges of average functionality may be achieved by using tetrafunctional or higher functionality polyfunctionalizing agents. Functionality may also be determined by factors such as stoichiometry, as will be understood by those skilled in the art.

In certain embodiments, a hydroxy-terminated sulfur-containing adduct may be formed by reacting a thiol-terminated sulfur-containing adduct with a hydroxy vinyl ether.

In certain embodiments, hydroxy vinyl ethers can be used to functionalize a thiol-terminated sulfur-containing adduct with a group reactive with an isocyanate group. In certain embodiments, a hydroxy-functional vinyl ether has the structure of Formula (19):

$CH_2=CH-O-(CH_2)_t-OH$ (19)

where t is an integer from 2 to 10.

Examples of suitable hydroxy-functional vinyl ethers useful for reacting with thiol-terminated sulfur-containing prepolymers include 1,4-cyclohexane dimethylol monovinyl ether, 1-methyl-3-hydroxypropyl vinyl ether, 4-hydroxybutyl vinyl ether, and a combination of any of the foregoing. In certain embodiments, a hydroxy-functional vinyl ether is 4-hydroxybutyl vinyl ether.

In certain embodiments, Michael acceptor-terminated urethane-containing prepolymers can be prepared in a three-step reaction. The reaction sequence involves providing an isocyanate-terminated urethane-containing adduct followed by capping the terminal isocyanate groups with a polyfunctional Michael acceptor. One skilled in the art will appreciate that other chemistries can be employed to synthesize the disclosed Michael acceptor-terminated urethane-containing prepolymers. For example, rather than using a thiol-terminated sulfur-containing prepolymer, an alkenyl-terminated sulfur-containing prepolymer may be used and linked to a polyisocyanate via a diamine. Thus, synthetic methods, precursors and intermediates as appropriate provided that the Michael acceptor-terminated urethane-containing prepolymer comprises a urethane- and sulfur-containing backbone having urethane groups capped with a polyfunctional Michael acceptor.

In a first step, a thiol-terminated sulfur-containing adduct can be reacted with a hydroxy vinyl ether to provide a hydroxy-terminated sulfur-containing adduct. The reaction can be performed at elevated temperature in the presence of a free-radical initiator.

In a second step, the hydroxy-terminated sulfur-containing adduct can be reacted with a polyisocyanate such as a diisocyanate to provide an isocyanate-terminated urethane-containing adduct. The reaction can be performed at elevated temperature in the presence of a tin catalyst.

In a third step, the isocyanate-terminated urethane-containing adduct can be reacted with a polyfunctional Michael acceptor to provide a polyfunctional Michael acceptor-terminated urethane-containing prepolymer of the present disclosure. The reaction can be performed at elevated temperature in the presence of a tin catalyst.

An example of a suitable reaction sequence is provided as follows:

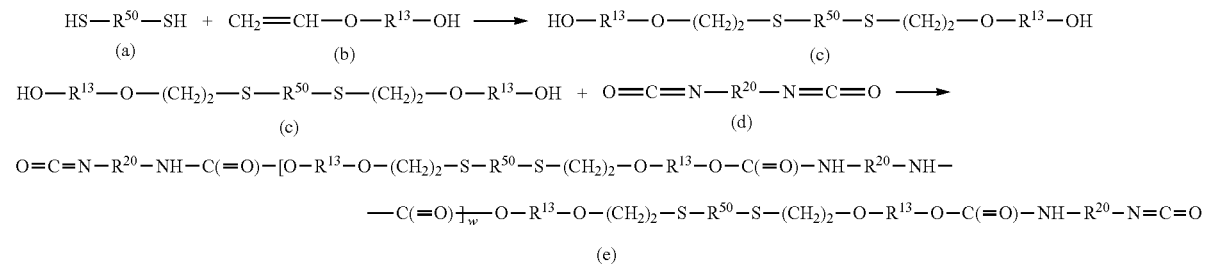

(e) + $CH_2=CH-S(O)_2-CH_2-CH(-OH)-CH_2-S(O)_2-CH=CH_2$ ⟶

(f)

$(CH_2=CH-S(O)_2-CH_2)_2CH-O-C(=O)-NH-R^{20}-NH-C(=O)-[O-R^{13}-O-(CH_2)_2-S-R^{50}-S-(CH_2)_2-O-$ $-R^{13}-O-C(=O)-NH-R^{20}-NH-C(=O)\frac{}{}_w-O-R^{13}-O-(CH_2)_2-S-R^{50}-S-(CH_2)_2-O-R^{13}-O-C(=O)-$ $-NH-R^{20}-NH-C(=O)-O-CH(-CH_2-S(O)_2)-CH=CH_2)_2$ (g)

where $R^{13}$, $R^{20}$, $R^{30}$, $R^{50}$, and $R^{60}$ are defined herein. An example of a reaction sequence is shown in FIG. 1. The reaction sequence illustrated above and in FIG. 1 begins with the reaction of a dithiol. In certain embodiments, the reaction can begin with a polythiol such as a trithiol, or with a mixture of polythiols such as a combination of dithiols and trithiols.

Michael acceptor-terminated urethane-containing prepolymers provided by the present disclosure may be included in compositions. Compositions containing Michael acceptor-terminated urethane-containing prepolymers may include one or more additives including one or more curing agents. In certain embodiments, a composition includes a latent curing agent that can be activated and/or released to initiate the curing reaction prior to use.

Michael acceptor-terminated urethane-containing prepolymers provided by the present disclosure include reactive Michael acceptor groups and therefore curable compositions can employ Michael acceptor curing chemistries.

Michael addition chemistries may be employed in a variety of ways to provide curable compositions. For example, a curable composition provided by the present disclosure may comprise a Michael acceptor-terminated urethane-containing prepolymer provided by the present disclosure and a curing agent comprising at least two terminal groups that are reactive with Michael acceptor groups. In certain compositions, the sulfur-containing compound comprises a sulfur-containing prepolymer such as a polythioether prepolymer comprising terminal groups reactive with Michael acceptor groups, in certain embodiments the sulfur-containing prepolymer comprises a polythioether prepolymer, and in certain embodiments, a thiol-terminated polythioether adduct.

In certain embodiments, a composition comprises a Michael acceptor-terminated urethane-containing prepolymer provided by the present disclosure and a curing agent. In certain embodiments, a curing agent may be a sulfur-containing compound, a sulfur-containing prepolymer, or a combination thereof comprising terminal groups reactive with Michael acceptor groups. In certain embodiments, a curing agent comprises terminal thiol groups reactive with Michael acceptor groups.

In certain compositions, a sulfur-containing prepolymer used as a curing agent comprises any of the thiol-terminated sulfur-containing adducts disclosed herein. In certain embodiments, a thiol-terminated sulfur-containing adduct comprises a polythioether prepolymer, and in certain embodiments a thiol-terminated polythioether adduct has an average functionality from 2 to 3, from 2.2 to 2.8, and in certain embodiments, from 2.4 to 2.6. In certain embodiments, a thiol-terminated sulfur-containing adduct has an average functionality of 2.

In certain embodiments, a curing agent comprises a thiol-terminated sulfur-containing adduct, including any of the thiol-terminated sulfur-containing adducts disclosed herein. In certain embodiments, a Michael-acceptor urethane-containing prepolymer comprises a prepolymer of Formula (6a), Formula (6b), Formula (8a), Formula (8b), or a combination of any of the foregoing, and a thiol-terminated sulfur-containing adduct curing agent comprises a polythioether of Formula (15a), Formula (15b), or a combination thereof. In certain embodiments, the thiol-terminated sulfur-containing prepolymer curing agent comprises Permapol® 3.1E.

In such compositions the Michael acceptor groups of the Michael acceptor urethane-containing prepolymer are reactive with the terminal groups of the sulfur-containing curing agent. For example, the Michael acceptor groups may be activated alkenyl groups, e.g., Michael acceptor groups, and the curing agent comprises terminal thiol groups.

A sulfur-containing compound used as a curing agent comprises at least two terminal groups reactive with Michael acceptor groups. A sulfur-containing compound used as a curing agent in such compositions may comprise a polythioether including any of those disclosed herein. The sulfur-containing compound may have an average functionality of about 2 or any functionality from about 2 and about 6, such as from about 2 to about 4, or from about 2 to about 3.

A sulfur-containing compound used as a curing agent may be a small molecule such as compound having a molecular weight less than 400 Daltons, a prepolymer, or a combination thereof. For example, a sulfur-containing compound may be a dithiol of Formula (16) such as, for example, DMDO, a polythiol of Formula (18), or a combination of any of the foregoing.

In certain embodiments, the sulfur-containing compound curing agent comprises a mixture of thiol-terminated polythioethers such as, for example, Permapol® 3.1E.

In certain embodiments, a composition comprises a Michael acceptor urethane-containing polythioether prepolymer provided by the present disclosure and a curing agent. A polythioether prepolymer includes any of those disclosed herein, such as polythioether prepolymer of Formula (6a), Formula (6b), Formula (8a), Formula (8b), and combinations of any of the foregoing.

In certain embodiments of such compositions, a composition comprises a Michael acceptor-terminated urethane-containing prepolymer provided by the present disclosure and a curing agent selected from a sulfur-containing compound comprising at least two terminal groups reactive with Michael acceptor groups, a monomeric thiol, a polythiol, and a combination of any of the foregoing. In certain embodiments, a curing agent comprises a sulfur-containing compound comprising at least two terminal groups reactive with Michael acceptor groups; in certain embodiments a monomeric thiol; and in certain embodiments a polythiol. In certain embodiments of such compositions, a curing agent comprises a sulfur-containing compound comprising at least two terminal groups reactive with Michael acceptor groups and a compound having at least two terminal groups reactive with Michael acceptor groups selected from a monomeric thiol, a polythiol, and a combination of any of the foregoing.

In certain embodiments, a sulfur-containing compound comprising at least two terminal groups reactive with Michael acceptor groups is selected from a polythioether compound comprising at least two terminal groups reactive with Michael acceptor groups. In certain embodiments, the terminal groups reactive with Michael acceptor groups are terminal thiol groups. In such embodiments, a thiol-terminated polythioether adduct may be selected from a thiol-terminated polythioether adduct of Formula (15a), a thiol-terminated polythioether adduct of Formula (15b), and a combination thereof.

In certain compositions, the curing agent comprises a monomeric polythiol. A monomeric polythiol refers to a compound having at least two terminal thiol groups. Examples of monomeric polythiols include dithiols of Formula (16) and/or polythiols of Formula (18).

In certain embodiments, a composition comprises a sulfur-containing curing agent reactive with Michael acceptor groups, and a Michael acceptor-terminated urethane-containing prepolymer provided by the present disclosure. In certain embodiments, a composition comprises a sulfur-containing curing agent, a polyfunctional Michael acceptor, and a Michael acceptor-terminated urethane-containing prepolymer provided by the present disclosure.

In such compositions, a sulfur-containing curing agent comprises at least two terminal groups reactive with Michael acceptor groups. In such compositions, the sulfur-containing curing agent may be selected from a thiol-terminated sulfur-containing compound.

In certain embodiments, a sulfur-containing curing agent can be selected such that the terminal groups are reactive with the polyfunctional Michael acceptor and the Michael acceptor-terminated urethane-containing prepolymer. In certain embodiments, a sulfur-containing curing agent comprises terminal thiol groups including any of the thiol-terminated polythioethers disclosed herein.

When a composition comprises a polyfunctional monomeric Michael acceptor, any suitable monomeric Michael acceptor having at least two Michael acceptor groups such as, for example, divinyl sulfone or other Michael acceptors including any of those disclosed herein may be used.

A polyfunctional Michael acceptor compound has at least two Michael acceptor groups.

A polyfunctional Michael acceptor may have an average Michael acceptor functionality from 2 to 6, from 2 to 4, from 2 to 3, and in certain embodiments, from 2.05 to 2.5. In certain embodiments, a polyfunctional Michael acceptor is difunctional, such as, divinyl ketone and divinyl sulfone. A Michael acceptor compound having a functionality greater than two may be prepared by reacting a compound having a Michael acceptor group and a group reactive with terminal groups of a polyfunctionalizing agent such as those disclosed herein, using appropriate reaction conditions.

In certain embodiments where a Michael acceptor compound is used, the molecular weight of the Michael acceptor is less than 600 Daltons, less than 400 Daltons, and in certain embodiments, less than 200 Daltons.

In certain embodiments, a Michael acceptor-terminated urethane-containing prepolymer is selected from a Michael acceptor urethane-containing polythioether prepolymer of Formula (6a), Formula (6b), Formula (8a), Formula (8b), and a combination of any of the foregoing; a polyfunctional sulfur-containing adduct is selected from an adduct of Formula (15a), Formula (15b), and a combination thereof; and a polyfunctional monomeric Michael acceptor is selected from a compound having two or more activated alkenyl groups such as a vinyl ketone or a vinyl sulfone, such as divinyl sulfone.

In certain embodiments, at least one of the sulfur-containing curing agent and the Michael acceptor urethane-containing prepolymer comprise a polythioether.

In certain embodiments, compositions comprise a sulfur-containing curing agent, a polyfunctional Michael acceptor, and a Michael acceptor-terminated urethane-containing prepolymer, and a controlled release catalyst including any of those disclosed herein.

In certain embodiments, compositions provided by the present disclosure comprise an epoxy resin. Thus, in addition to a Michael acceptor-terminated urethane-containing prepolymer, a composition may comprise one or more polyepoxy curing agents. Examples of suitable epoxies include, for example, polyepoxide resins such as hydantoin diepoxide, diglycidyl ether of bisphenol-A, diglycidyl ether of bisphenol-F, Novolac® type epoxides such as DEN™ 438, certain epoxidized unsaturated resins, and combinations of any of the foregoing. A polyepoxide refers to a compound having two or more reactive epoxy groups. In certain embodiments, a polyepoxy resin may be combined with a Michael acceptor-terminated urethane-containing prepolymer and then combined with a thiol-terminated curing agent.

In certain embodiments, a polyepoxy resin comprises an epoxy-functional compound. Examples of suitable epoxy-functional compounds include the epoxy-functional sulfur-containing polyformal compounds disclosed in U.S. Pat. No. 8,541,513 and epoxy-functional polythioether compounds disclosed in U.S. Pat. No. 7,671,145. In general, when used as a curing agent, an epoxy-functional compound has a molecular weight less than about 2,000 Daltons, less than about 1,500, Daltons, less than about 1,000 Daltons, and in certain embodiments, less than about 500 Daltons.

In certain embodiments, a catalyst can be combined with a Michael acceptor-terminated urethane-containing prepolymer shortly prior to use. In certain embodiments, a composition may comprise a latent or controlled-release catalyst.

Compositions provided by the present disclosure may include one or more catalysts. Catalysts appropriate for use in reactions between Michael acceptors such as activated alkenyl groups and thiol groups include base catalysts such as amines. Examples of suitable amine catalysts include, for example, triethylenediamine(1,4-diazabicyclo[2.2.2]octane, DABCO), dimethylcyclohexylamine (DMCHA), dimethylethanolamine (DMEA), bis-(2-dimethylaminoethyl)ether, N-ethylmorpholine, triethylamine, 1,8-diazabicyclo[5.4.0]undecene-7 (DBU), pentamethyldiethylenetriamine (PMDETA), benzyldimethylamine (BDMA), N,N,N'-trimethyl-N'-hydroxyethyl-bis(aminoethyl)ether, and N'-(3-(dimethylamino)propyl)-N,N-dimethyl-1,3-propanediamine.

In compositions comprising epoxies, a composition may comprise a base catalyst, including amine catalysts such as any of those disclosed herein.

Controlled-release amine catalysts have little or no activity until released, either chemically or physically. In certain embodiments, a controlled-release amine catalyst may be released upon exposure to ultraviolet radiation, heat, ultrasonication, or moisture.

In the case of controlled release amine catalysts that are released by ultraviolet radiation or moisture, the amine catalyst comprises a blocking group that deblocks upon exposure to the ultraviolet radiation or moisture to release or unblock a reactive amine catalyst. In matrix encapsulant systems, the amine catalyst is trapped among side chains of a crystalline or semi-crystalline polymer. At elevated temperature, the polymer melts allowing the amine catalyst to diffuse into the composition to catalyze the reaction.

In certain embodiments, a controlled release catalyst comprises a controlled release amine catalyst. In certain embodiment, a controlled release amine catalyst may be a controlled release primary amine catalyst, a controlled release secondary amine catalyst, or a controlled release tertiary amine catalyst. Examples of suitable primary amine catalysts include, for example, $C_{3-10}$ aliphatic primary amines, such as heptane amine, hexylamine, and octamine. Examples of suitable secondary amine catalysts include, for example, cycloaliphatic diamines such as Jefflink® 754 and aliphatic diamines such as Clearlink® 1000. Examples of suitable tertiary amine catalysts include, for example, N,N-dimethylethanolamine (DMEA), diaminobicyclooctane (DABCO), triethylene diamine (TEDA), bis(2-dimethylaminoethyl) ether (BDMAEE), N-ethylmorpholine, N'N'-dimethylpiperazine, N,N,N',N',N"-pentamethyl-diethylene-triamine (PMDETA), N,N'-dimethylcyclohexylamine (DMCHA), N,N-dimethylbenzylamine (DMBA), N,N-dimethylcethylamine, N,N,N',N",N"-pentamethyl-dipropylene-triamine (PMDPTA), triethylamine, and 1-(2-hydroxypropyl) imidazole. Other suitable amine catalysts include amidine catalysts such as tetramethyguanidine (TMG), dizabicyclononene (DBN), diazabicycloundecene (DBU) and imidazoles; and bicyclic guanidines such as 1,5,7,-triazabicyclo[4.4.0]dec-5-ene (TBD) and 1,5,7,-triazabicyclo[4.4.0]dec-5-ene, 7-methyl (MTBD).

In certain embodiments, an amine catalyst is selected from DBU, DABCO, isophorone diamine (IPDA), a $C_{6-10}$ primary amine, and a combination of any of the foregoing.

Compositions may comprise one or more different types of amine catalyst.

When released, controlled release amine catalysts provided by the present disclosure catalyze the reaction between a compound containing at least two terminal groups that are reactive with Michael acceptor groups and a compound comprising at least two Michael acceptor groups such as Michael acceptor-terminated urethane-containing prepolymer provided by the present disclosure.

In controlled release compositions provided by the present disclosure, the pot life of a composition can be greater than 2 weeks if the catalyst is not released. When the catalyst is released, either by chemical, photochemical, or physical mechanisms, the cure time can be less than 72 hours, less than 60 hours, less than 48 hours, less than 36 hours, and in certain embodiments less than 24 hours. The cure time without heating and in the presence of ambient moisture, can be several days such as, for example, 7 days.

Certain compositions provided by the present disclosure comprise a photolabile catalyst. In such systems, ultraviolet radiation unblocks a blocked amine catalyst, which catalyzes the Michael addition reaction between a compound comprising at least two terminal groups that are reactive with Michael acceptor groups and a compound comprising at least two Michael acceptor groups. In certain embodiments, the ultraviolet radiation initiates the reaction, which takes place over time, such as for example several hours. The slow curing can be useful to improve surface adhesion and to extend the pot life to provide a longer working time.

Photolabile amines comprise a photolabile moiety bonded to an amine.

In certain embodiments, a photolabile catalyst comprises CGI 90 (BASF), which following UV activation, generates the tertiary amine, 1,5-diazabicyclo(4.3.0)non-5-ene (DBN). Other suitable photolabile amines are disclosed in International Publication No. WO 2003/033500 and in the documents cited therein.

In compositions comprising a photolabile amine catalyst, the photolabile amine catalyst may comprise from 0.1 wt % to 5 wt % of the composition, from 0.3 wt % to 2 wt % of the composition, and in certain embodiments, from 0.5 wt % of the composition to 1 wt % of the composition.

In certain embodiments, a controlled release amine catalyst comprises a moisture-released blocked amine catalyst. In such systems, the blocked amine catalyst can be unblocked in the presence of moisture to release an amine catalyst capable of catalyzing a Michael addition reaction. Examples of moisture-release blocked amine catalysts include ketimines, enamines, oxazolidines, aldimines, and imidazolidines. In the presence of moisture, the blocking group, e.g., the ketimine, enamine, oxazolidine, aldimine, or imidazolidine blocking group or groups reacts with water to provide a catalytic amine catalyst and a ketone or alcohol.

In certain embodiments, a composition comprising a moisture-released amine catalyst comprises from 0.1 wt % to 2 wt % water, from 0.2 wt % to 1.5 wt % water, and in certain embodiments, from 0.5 wt % to 1 wt % water.

In certain embodiments, a moisture-released blocked amine catalyst releases a primary amine, a secondary amine, and in certain embodiments a tertiary amine. In certain embodiments, a moisture-released blocked amine catalyst is Vestamin® A139, which is a blocked cycloaliphatic diamine. In certain embodiments, the unblocked amine is isophorone diamine (IPDA).

In compositions comprising a moisture-released amine catalyst, the moisture released amine catalyst may comprise from 0.1 wt % to 4 wt % of the composition, from 0.5 wt % to 3 wt % of the composition, and in certain embodiments, from 1 wt % of the composition to 2 wt % of the composition.

In certain embodiments, the ratio (wt %/wt %) of wt % water to moisture-released amine catalyst (wt %) in compositions provided by the present disclosure can be from 1 to 4, from 1 to 2, and in certain embodiment, from 1 to 1.

Compositions comprising a moisture-released blocked amine catalyst may, in addition to being stored a low temperature, may be stored such as to prevent exposure to ambient moisture.

Matrix encapsulation is a process by which droplets or particles of liquid or solid material are trapped among side chains of a crystalline polymer. With increased temperature, the crystalline polymer becomes amorphous and releases the droplets or particles into the medium. Matrix encapsulants provided by the present disclosure comprise a crystalline matrix material incorporating droplets or particles comprising an amine catalyst. Thus, the rate of reaction is to some extent controlled by temperature-dependent diffusion of the amine catalyst from the crystalline polymer. The crystalline polymers may have a sharp well-defined melting point or may exhibit a melting point range. The use of waxy polymers for encapsulation of amine catalysts used in Michael addition compositions is disclosed in U.S. Application Publication No. 2007/0173602.

Examples of suitable matrix encapsulants include Intelimer® polymers (Air Products), such as Intelimer® 13-1 and Intelimer® 13-6. The properties of Intelimer® polymers is disclosed in Lowry et al., "Cure evaluation of Intelimer® latent curing agents for thermoset resin applications," presented at the Thermoset Resin Formulators Association Meeting, Chicago, Ill., Sep. 15-16, 2008.

A matrix encapsulant may be selected to release the amine catalyst following a brief high temperature exposure such as for less than 10 minutes, less than 5 minutes, or less than 2 minutes. During this brief temperature excursion, amine catalyst is released from the matrix and diffuses into the reactive polymer components. The composition may be heated during the curing process or may be left at ambient temperature. When left at ambient temperature, the released amine catalyst composition may cure in less than 2 hours, in less than 4 hours, and in certain embodiments, in less than 6 hours.

Amine catalysts may be incorporated into a matrix encapsulant by blending at a temperature above the melt temperature of the matrix encapsulant, rapidly cooling the mixture, and grinding the solid to a powder. In certain embodiments, the average particle size is less than 200 µm, less than 150 µm, less than 100 µm, less than 50 µm, and in certain embodiments, less than 25 µm.

In certain embodiments, a composition may comprise from 0.1 wt % to 25 wt %, from 1 wt % to 15 wt %, and in certain embodiments, from 5 wt % to 10 wt % of a matrix encapsulant comprising an amine catalyst. This correlates to about 0.01 wt % to 2 wt %, from 0.05 wt % to 1.5 wt %, and in certain embodiments, from 0.5 wt % to 1 wt % of an amine catalyst.

In certain embodiments, a matrix encapsulant suitable for use in compositions provided by the present disclosure comprises a ratio (wt %/wt %) of wt % amine catalyst to wt % matrix polymer from 1 to 15, from 2 to 10, and in certain embodiments, from 5 to 8.

Compositions provided by the present disclosure may include one or more catalysts. A catalyst can be selected as appropriate for the curing chemistry employed. In certain embodiments, for example, when curing thiol-terminated bis (sulfonyl)alkanol-containing polythioethers or prepolymers and polyepoxides, the catalyst can be an amine catalyst. A cure catalyst may be present in an amount from 0.1 to 5 weight percent, based on the total weight of the composition. Examples of suitable catalysts include 1,4-diazabicyclo [2.2.2]octane (DABCO®, commercially available from Air Products, Chemical Additives Division, Allentown, Pa.) and DMP-30® (an accelerant composition including 2,4,6-tris (dimethylaminomethyl)phenol. Other examples of suitable amine catalysts include, for example, triethylenediamine(1, 4-diazabicyclo[2.2.2]octane, DABCO), dimethylcyclohexylamine (DMCHA), dimethylethanolamine (DMEA), bis-(2-dimethylaminoethyl)ether, N-ethylmorpholine, triethylamine, 1,8-diazabicyclo[5.4.0]undecene-7 (DBU), pentamethyldiethylenetriamine (PMDETA), benzyldimethylamine (BDMA), N,N,N'-trimethyl-N'-hydroxyethyl-bis (aminoethyl)ether, and N'-(3-(dimethylamino)propyl)-N,N-dimethyl-1,3-propanediamine.

In certain embodiments, compositions provided by the present disclosure comprise one or more than one adhesion promoters. A one or more additional adhesion promoter may be present in amount from 0.1 wt % to 15 wt % of a composition, less than 5 wt %, less than 2 wt %, and in certain embodiments, less than 1 wt %, based on the total dry weight of the composition. Examples of adhesion promoters include phenolics, such as Methylon® phenolic resin, and organosilanes, such as epoxy, mercapto or amino functional silanes, such as Silquest® A-187 and Silquest® A-1100. Other useful adhesion promoters are known in the art.

In certain embodiments, a composition provided by the present disclosure comprises an ethylenically unsaturated silane, such as, for example, a sulfur-containing ethylenically unsaturated silane, which can improve the adhesion of a cured sealant to a metal substrate. As used herein, the term sulfur-containing ethylenically unsaturated silane refers to a molecular compound that comprises, within the molecule, (i) at least one sulfur (S) atom, (ii) at least one, in some cases at least two, ethylenically unsaturated carbon-carbon bonds, such as a carbon-carbon double bonds (C=C); and (iii) at least one silane group, —Si(—R)$_m$(—OR)$_{3-m}$, where each R is independently selected from hydrogen, alkyl, cycloalkyl, aryl, and others, and m is selected from 0, 1, and 2. Examples of ethylenically unsaturated silanes are disclosed in U.S. Publication No. 2012/0040104, which is incorporated by reference in its entirety.

In certain embodiments, compositions provided by the present disclosure may be cured using actinic radiation. Examples of compositions comprising polythioether compositions curable using actinic radiation are disclosed in U.S. Publication No. 2012/0040104. Such compositions may include, in addition to an adhesion promoting adduct provided by the present disclosure, and one or more sulfur-containing polymers such as thiol-terminated sulfur-containing polymers, a polyene such as a polyvinyl ether including, for example, a polyvinyl ether of Formula (17).

Compositions provided by the present disclosure may include one or more catalysts.

Compositions provided by the present disclosure may comprise one or more additional components suitable for use in aerospace sealants and depend at least in part on the desired performance characteristics of the cured sealant under conditions of use.

In certain embodiments, compositions provided by the present disclosure comprise one or more than one adhesion promoters. A one or more additional adhesion promoter may be present in amount from 0.1 wt % to 15 wt % of a composition, less than 5 wt %, less than 2 wt %, and in certain embodiments, less than 1 wt %, based on the total dry weight of the composition. Examples of adhesion promoters include phenolics, such as Methylon® phenolic resin, and organosilanes, such as epoxy, mercapto or amino functional silanes, such as Silquest® A-187 and Silquest® A-1100. Other useful adhesion promoters are known in the art.

Compositions provided by the present disclosure may comprise one or more different types of filler. Suitable fillers include those commonly known in the art, including inorganic fillers, such as carbon black and calcium carbonate (CaCO$_3$), silica, polymer powders, and lightweight fillers. Suitable lightweight fillers include, for example, those described in U.S. Pat. No. 6,525,168. In certain embodiments, a composition includes 5 wt % to 60 wt % of the filler or combination of fillers, 10 wt % to 50 wt %, and in certain embodiments, from 20 wt % to 40 wt %, based on the total dry weight of the composition. Compositions provided by the present disclosure may further include one or more colorants, thixotropic agents, accelerators, fire retardants, adhesion promoters, solvents, masking agents, or a combination of any of the foregoing. As can be appreciated, fillers and additives employed in a composition may be selected so as to be compatible with each other as well as the polymeric component, curing agent, and or catalyst.

In certain embodiments, compositions provided by the present disclosure include low density filler particles. As used herein, low density, when used with reference to such particles means that the particles have a specific gravity of no more than 0.7, in certain embodiments no more than 0.25, and in certain embodiments, no more than 0.1. Suitable lightweight filler particles often fall within two categories—microspheres and amorphous particles. The specific gravity of microspheres may range from 0.1 to 0.7 and include, for example, polystyrene foam, microspheres of polyacrylates and polyolefins, and silica microspheres having particle sizes ranging from 5 microns to 100 microns and a specific gravity of 0.25 (Eccospheres®). Other examples include alumina/ silica microspheres having particle sizes in the range of 5 microns to 300 microns and a specific gravity of 0.7 (Fillite®), aluminum silicate microspheres having a specific gravity of from about 0.45 to about 0.7 (Z-Light®), calcium carbonate-coated polyvinylidene copolymer microspheres having a specific gravity of 0.13 (Dualite® 6001AE), and calcium carbonate coated acrylonitrile copolymer microspheres such as Dualite® E135, having an average particle size of about 40 μm and a density of 0.135 g/cc (Henkel). Suitable fillers for decreasing the specific gravity of the composition include, for example, hollow microspheres such as Expancel® microspheres (available from AkzoNobel) or Dualite® low density polymer microspheres (available from Henkel). In certain embodiments, compositions provided by the present disclosure include lightweight filler particles comprising an exterior surface coated with a thin coating, such as those described in U.S. Publication No. 2010/0041839 at paragraphs [0016]-[0052], the cited portion of which is incorporated herein by reference.

In certain embodiments, a low density filler comprises less than 2 wt % of a composition, less than 1.5 wt %, less than 1.0 wt %, less than 0.8 wt %, less than 0.75 wt %, less than 0.7 wt % and in certain embodiments, less than 0.5 wt % of a composition, where wt % is based on the total dry solids weight of the composition.

In certain embodiments, compositions provided by the present disclosure comprise at least one filler that is effective in reducing the specific gravity of the composition. In certain embodiments, the specific gravity of a composition is from 0.8 to 1, from 0.7 to 0.9, from 0.75 to 0.85, and in certain embodiments, is about 0.8. In certain embodiments, the specific gravity of a composition is less than about 0.9, less than about 0.8, less than about 0.75, less than about 0.7, less than about 0.65, less than about 0.6, and in certain embodiments, less than about 0.55.

A composition may also include any number of additives as desired. Examples of suitable additives include plasticizers, pigments, surfactants, adhesion promoters, thixotropic agents, fire retardants, masking agents, and accelerators (such as amines, including 1,4-diaza-bicyclo[2.2.2]octane, DABCO®), and combinations of any of the foregoing. When used, the additives may be present in a composition in an amount ranging, for example, from about 0 wt % to 60 wt %. In certain embodiments, additives may be present in a composition in an amount ranging from about 25 wt % to 60 wt %.

Compositions provided by the present disclosure may be used, for example, in sealants, coatings, encapsulants, and potting compositions. A sealant includes a composition capable of producing a film that has the ability to resist operational conditions, such as moisture and temperature, and at least partially block the transmission of materials, such as water, fuel, and other liquid and gases. A coating composition includes a covering that is applied to the surface of a substrate to, for example, improve the properties of the substrate such as the appearance, adhesion, wettability, corrosion resistance, wear resistance, fuel resistance, and/or abrasion resistance. A potting composition includes a material useful in an electronic assembly to provide resistance to shock and vibration and to exclude moisture and corrosive agents. In certain embodiments, sealant compositions provided by the present disclosure are useful, e.g., as aerospace sealants and as linings for fuel tanks.

In certain embodiments, compositions containing Michael acceptor-terminated urethane-containing prepolymers are formulated as sealants.

In embodiments, compositions, such as sealants, may be provided as multi-pack compositions, such as two-pack compositions, wherein one package comprises one or more thiol-terminated polythioethers provided by the present disclosure and a second package comprises one or more polyfunctional Michael acceptor-terminated urethane-containing prepolymers provided by the present disclosure. Additives and/or other materials may be added to either package as desired or necessary. The two packages may be combined and mixed prior to use. In certain embodiments, the pot life of the one or more mixed thiol-terminated polythioethers and epoxies is at least 30 minutes, at least 1 hour, at least 2 hours, and in certain embodiments, more than 2 hours, where pot life refers to the period of time the mixed composition remains suitable for use as a sealant after mixing.

Compositions, including sealants, provided by the present disclosure may be applied to any of a variety of substrates. Examples of substrates to which a composition may be applied include metals such as titanium, stainless steel, and aluminum, any of which may be anodized, primed, organic-coated or chromate-coated; epoxy; urethane; graphite; fiberglass composite; Kevlar®; acrylics; and polycarbonates. In certain embodiments, compositions provided by the present disclosure may be applied to a coating on a substrate, such as a polyurethane coating.

Compositions provided by the present disclosure may be applied directly onto the surface of a substrate or over an underlayer by any suitable coating process.

Furthermore, methods are provided for sealing an aperture utilizing a composition provided by the present disclosure. These methods comprise, for example, applying a composition provided by the present disclosure to a surface to seal an aperture, and curing the composition. In certain embodiments, a method for sealing an aperture comprises applying a sealant composition provided by the present disclosure to surfaces defining an aperture and curing the sealant, to provide a sealed aperture.

In certain embodiments, a composition may be cured under ambient conditions, where ambient conditions refers to a temperature from 20° C. to 25° C., and atmospheric humidity. In certain embodiments, a composition may be cured under conditions encompassing a temperature from a 0° C. to 100° C. and humidity from 0% relative humidity to 100% relative humidity. In certain embodiments, a composition may be cured at a higher temperature such as at least 30° C., at least 40° C., and in certain embodiments, at least 50° C. In certain embodiments, a composition may be cured at room temperature, e.g., 25° C. In certain embodiments, a composition may be cured upon exposure to actinic radiation, such as ultraviolet radiation. As will also be appreciated, the methods may be used to seal apertures on aerospace vehicles including aircraft and aerospace vehicles.

In certain embodiments, the composition achieves a tack-free cure in less than about 2 hours, less than about 4 hours, less than about 6 hours, less than about 8 hours, and in certain embodiments, less than about 10 hours, at a temperature of less than about 200° F.

The time to form a viable seal using curable compositions of the present disclosure can depend on several factors as can be appreciated by those skilled in the art, and as defined by the requirements of applicable standards and specifications. In general, curable compositions of the present disclosure develop adhesion strength within 24 hours to 30 hours, and 90% of full adhesion strength develops from 2 days to 3 days, following mixing and application to a surface. In general, full adhesion strength as well as other properties of cured compositions of the present disclosure becomes fully developed within 7 days following mixing and application of a curable composition to a surface.

For aerospace sealant applications it can be desirable that a sealant meet the requirements of Mil-S-22473E (Sealant Grade C) at a cured thickness of 20 mils, exhibit an elongation greater than 200%, a tensile strength greater than 250 psi, and excellent fuel resistance, and maintain these properties over a wide temperature range from −67° F. to 360° F. In general, the visual appearance of the sealant is not an important attribute. Prior to cure, it is desirable that the mixed components have a useful working time or pot life of at least 24 hours and have a cure time within 24 hours of the pot life. Useful working time or pot life refers to the time period the composition remains workable for application at ambient temperatures after the catalyst is released. In certain embodiments, compositions provided by the present disclosure, following release of the catalytic amine, have a pot life of at least 6 hours, at least 12 hours, at least 18 hours, at least 24 hours, and in certain embodiments, more than 24 hours. In certain embodiments, compositions provided by the present disclosure cure in less than 6 hours after the pot life, in less than 12 hours, in less than 18 hours, in less than 24 hours, in less than 48 hours, and in certain embodiments, in less than 72 hours after useful working time.

Cured compositions disclosed herein, such as cured sealants, exhibit properties acceptable for use in aerospace applications. In general, it is desirable that sealants used in aviation and aerospace applications exhibit the following properties: peel strength greater than 20 pounds per linear inch (pli) on Aerospace Material Specification (AMS) 3265B substrates determined under dry conditions, following immersion in JRF Type I for 7 days, and following immersion in a solution of 3% NaCl according to AMS 3265B test specifications; tensile strength between 300 pounds per square inch (psi) and 400 psi; tear strength greater than 50 pounds per linear inch (pli); elongation between 250% and 300%; and hardness greater than 40 Durometer A. These and other cured sealant properties appropriate for aviation and aerospace applications are disclosed in AMS 3265B, the entirety of which is incorporated by reference. It is also desirable that, when cured, compositions of the present disclosure used in aviation and aircraft applications exhibit a percent volume swell not greater than 25% following immersion for one week at 60° C. (140° F.) and ambient pressure in JRF Type I. Other properties, ranges, and/or thresholds may be appropriate for other sealant applications.

In certain embodiments, therefore, compositions provided by the present disclosure are fuel-resistant. As used herein, the term "fuel resistant" means that a composition, when applied to a substrate and cured, can provide a cured product, such as a sealant, that exhibits a percent volume swell of not greater than 40%, in some cases not greater than 25%, in some cases not greater than 20%, in yet other cases not more than 10%, after immersion for one week at 140° F. (60° C.) and ambient pressure in Jet Reference Fluid (JRF) Type I according to methods similar to those described in ASTM D792 (American Society for Testing and Materials) or AMS 3269 (Aerospace Material Specification). Jet Reference Fluid JRF Type I, as employed for determination of fuel resistance, has the following composition: toluene: 28%±1% by volume; cyclohexane (technical): 34%±1% by volume; isooctane: 38%±1% by volume; and tertiary dibutyl disulfide: 1%±0.005% by volume (see AMS 2629, issued Jul. 1, 1989, §3.1.1 etc., available from SAE (Society of Automotive Engineers)).

In certain embodiments, compositions provided herein provide a cured product, such as a sealant, exhibiting a tensile elongation of at least 100% and a tensile strength of at least 400 psi when measured in accordance with the procedure described in AMS 3279, §3.3.17.1, test procedure AS5127/1, §7.7.

In certain embodiments, a cured sealant comprising a composition provided by the present disclosure meets or exceeds the requirements for aerospace sealants as set forth in AMS 3277.

Apertures, including apertures of aerospace vehicles, sealed with compositions provided by the present disclosure are also disclosed.

EXAMPLES

Embodiments provided by the present disclosure are further illustrated by reference to the following examples, which describe the synthesis, properties, and uses of certain Michael acceptor-terminated urethane-containing prepolymers provided by the present disclosure. It will be apparent to those skilled in the art that many modifications, both to materials, and methods, may be practiced without departing from the scope of the disclosure.

Example 1

Synthesis of Thiol-Terminated Polythioether Adduct

A thiol-terminated polythioether was prepared according to Example 1 of U.S. Pat. No. 6,172,179. In a 2-L flask, 524.8 g (3.32 mol) of diethylene glycol divinyl ether (DEG-DVE) and 706.7 g (3.87 mol) of dimercaptodioxaoctane (DMDO) were mixed with 19.7 g (0.08 mol) of triallylcyanurate (TAC) and heated to 77° C. To the reaction mixture was added 4.6 g (0.024 mol) of an azobisnitrile free radical catalyst (Vazo®-67, 2,2'-azobis(2-methylbutyronitrile)). The reaction proceeded substantially to completion after 2 hours to afford 1,250 g (0.39 mol, yield 100%) of a liquid thiol-terminated polythioether adduct having a $T_g$ of −68° C. and a viscosity of 65 poise. The adduct was faintly yellow and had low odor.

Example 2

Synthesis of $H_{12}$MDI-Terminated Polythioether Adduct—

A 1-liter, 4-neck round-bottomed flask was fitted with a mantle, thermocouple, temperature controller, nitrogen line, mechanical stirrer and dropping funnel. The flask was charged with a thiol-terminated polythioether (652.30 g) prepared according to Example 1 of U.S. Pat. No. 6,172,179 (see previous paragraph). The flask was heated to 71° C. under nitrogen and stirred at 300 rpm. A mixture of 4-hydroxybutyl vinyl ether (47.40 g) and Vazo®-67 (1.19 g) was added to the flask in 1 hour via a dropping funnel. The reaction mixture was maintained at 71° C. for 41 hours, at which time the reaction was complete. After this, the reaction apparatus was then fitted with a vacuum line and the product heated to 94° C. Heating was continued for 1.3 hours under vacuum. Following vacuum treatment, a pale yellow, viscous polythioether polyol (678.80 g) was obtained. The polythioether polyol (hydroxy-terminated polythioether adduct) had a hydroxy number of 31.8 and a viscosity of 77 Poise.

The polythioether polyol (300.03 g) was then charged into a 500-mL, 4-neck, round-bottom flask. The flask was equipped with a mantle, thermocouple, temperature controller, an inlet for providing nitrogen positive pressure, and a mechanical stirrer (PTFE paddle and bearing). The polythioether polyol was stirred at ca. 200 rpm and heated to 76.6° C.

(170° F.), followed by the addition of Desmodur®-W (H₁₂MDI) (82.00 g) and a 0.01% solution of dibutyltin dilaurate dissolved in methyl ethyl ketone (3.90 g). The reaction mixture was maintained at 76.6° C. for 7 h and then cooled to room temperature. A 1% solution of benzyl chloride dissolved in methyl ethyl ketone (3.80 g) was then added to the reaction mixture. The resulting H₁₂MDI-terminated polythioether adduct (isocyanate-terminated urethane-containing polythioether adduct) had an isocyanate content of 3.9%.

Example 3

Synthesis of Bis(Vinylsulfonyl)-Terminated Urethane-Containing Polythioether Prepolymer In a 300 mL, 3-necked round flask, fitted with a stirrer, thermal probe, and nitrogen inlet, was added 100 g of the isocyanate-terminated urethane-containing polythioether adduct described in Example 2 and 22 g of 3-bis(vinylsulfonyl)-2-propanol, and the temperature of the reaction was set to 85° C. Once the temperature reached 85° C., 3-bis(vinylsulfonyl)-2-propanol was homogenously dissolved in the polymer. 40 μL of tin catalyst (DABCO T-12, dibutyltin dilaurate) was subsequently added to catalyze the reaction of the isocyanate groups of the polymer with the hydroxy groups of 3-bis(vinylsulfonyl)-2-propanol. After 15 min, the temperature of the reaction reached 109° C. After the reaction was completed in about 60 minutes, the reaction mixture was removed from heat, poured out the flask, and cooled down.

Example 4

Preparation of Encapsulated Catalyst 9.3 grams of Intelimer® 13-6 (from Air Products and Chemicals, Allentown, Pa.) and 0.7 gram of isophorone diamine(3-aminomethyl-3,5,5-trimethylcyclohexylamine, Vestamin® IPD, Evonik Industries) were blended at 80° C. for 30 minutes. The mixture was rapidly cooled to room temperature and then ground to powders with an average particle size of 25 microns.

Example 5

Michael Acceptor-Terminated Urethane-Containing Prepolymer Sealant

The thiol-terminated polythioether adduct described in Example 1 (4.76 g), the bis(vinylsulfonyl)-terminated urethane-containing polythioether prepolymer described in Example 3 (3.95 g), encapsulated amine catalyst (0.11 g, Novacure™ HX-3722), and the encapsulated amine catalyst described in Example 4 (10 mg) were mixed for 30 seconds at 2300 rpm with a DAC 600 FVZ Speed Mixer. A portion of the mixture was allowed to sit in room temperature for 2 days. The material remains uncured for 2 days.

A second portion of the mixture was heated for 5 minutes at 180° F. and then allowed to sit at room temperature. The material became tack-free in 2.5 hours and completely cured into a solid elastomer in 16 hours.

Finally, it should be noted that there are alternative ways of implementing the embodiments disclosed herein. Accordingly, the present embodiments are to be considered as illustrative and not restrictive. Furthermore, the claims are not to be limited to the details given herein, and are entitled their full scope and equivalents thereof.

What is claimed is:

1. A Michael acceptor-terminated urethane-containing prepolymer comprising the reaction product of reactants comprising:
  (a) an isocyanate-terminated urethane-containing adduct; and
  (b) a bis(vinylsulfonyl)alkanol.

2. The prepolymer of claim 1, wherein the bis(vinylsulfonyl)alkanol comprises 1,3-bis(vinylsulfonyl)-2-propanol.

3. A Michael acceptor-terminated urethane-containing prepolymer comprising a prepolymer of Formula (6a), a prepolymer of Formula (6b), or a combination thereof:

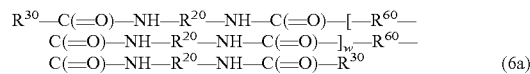

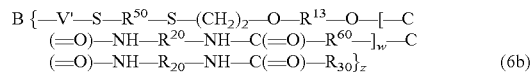

wherein,
  w is an integer from 1 to 100;
  each $R^{13}$ independently comprises $C_{2-10}$ alkanediyl;
  each $R^{20}$ independently comprises a core of a diisocyanate;
  each $R^{30}$ independently comprises the structure of Formula (9):

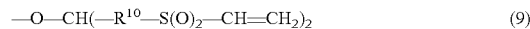

wherein $R^{10}$ is $C_{1-3}$ alkane-diyl;
  each $R^{50}$ independently comprises a core of a sulfur-containing prepolymer;
  each $R^{60}$ independently comprises a moiety having the structure of Formula (7):

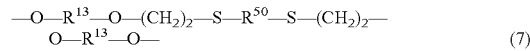

B represents a core of a z-valent, polyfunctionalizing agent $B(-V)_z$ wherein,
    z is an integer from 3 to 6; and
    each V is a moiety comprising a terminal group reactive with a thiol group; and
  each —V'— is derived from the reaction of —V with a thiol.

4. A composition comprising:
  the Michael acceptor-terminated urethane-containing prepolymer of claim 3; and
  an amine catalyst.

5. The composition of claim 4, comprising a thiol-terminated sulfur-containing adduct.

6. The composition of claim 5, wherein the thiol-terminated sulfur-containing adduct comprises a thiol-terminated polythioether, a thiol-terminated polysulfide, a thiol-terminated sulfur-containing polyformal, or a combination of any of the foregoing.

7. The composition of claim 4, wherein the amine catalyst comprises a controlled-release amine catalyst.

8. The composition of claim 4, formulated as a sealant.

9. A cured sealant, prepared from the composition of claim 4.

10. The prepolymer of claim 1, wherein the isocyanate-terminated urethane-containing adduct comprises the reaction product of reactants comprising:
  (a) a hydroxy-terminated sulfur-containing adduct; and
  (b) a diisocyanate.

11. The prepolymer of claim 10, wherein the hydroxy-terminated sulfur-containing adduct comprises a hydroxy-terminated polythioether adduct of Formula (12a), a hydroxy-terminated polythioether adduct of Formula (12b), or a combination thereof:

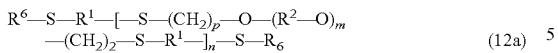  (12a)

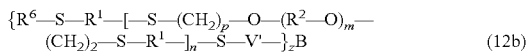  (12b)

wherein, each $R^1$ independently is selected from $C_{2-10}$ alkanediyl, $C_{6-8}$ cycloalkanediyl, $C_{6-10}$ alkanecycloalkanediyl, $C_{5-8}$ heterocycloalkanediyl, and $—[(—CHR^3—)_s—X—]_q—(—CHR^3—)_r—$, wherein, s is an integer from 2 to 6;

q is an integer from 1 to 5;

r is an integer from 2 to 10;

each $R^3$ is independently selected from hydrogen and methyl; and each X is independently selected from —O—, —S—, and —NR—, wherein R is selected from hydrogen and methyl;

each $R^2$ is independently selected from $C_{1-10}$ alkanediyl, $C_{6-8}$ cycloalkanediyl, $C_{6-14}$ alkanecycloalkanediyl, and $—[(—CHR^3—)_s—X—]_q—(—CHR^3—)_r—$, wherein s, q, r, $R^3$, and X are as defined for $R^1$;

m is an integer from 0 to 50;

n is an integer from 1 to 60; and p is an integer from 2 to 6;

each $R^6$ is independently selected from —CH$_2$—CH$_2$—O—R$^{13}$—OH, wherein each $R^{13}$ is $C_{2-10}$ alkanediyl; and B represents a core of a z-valent, polyfunctionalizing agent B (—V)$_z$ wherein, z is an integer from 3 to 6; and each V is a moiety comprising a terminal group reactive with a thiol group; and each —V'— is derived from the reaction of —V with a thiol.

12. The prepolymer of claim 10, wherein the hydroxy-terminated sulfur-containing adduct comprises the reaction product of reactants comprising:

(a) a thiol-terminated sulfur-containing adduct; and (b) a hydroxy vinyl ether.

13. The prepolymer of claim 12, wherein the thiol-terminated sulfur-containing adduct comprises a thiol-terminated polythioether adduct of Formula (15a), a thiol-terminated polythioether adduct of Formula (15b), or a combination thereof:

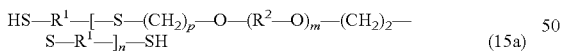  (15a)

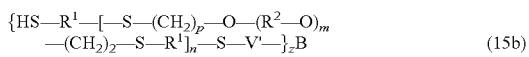  (15b)

wherein, each $R^1$ independently is selected from $C_{2-10}$ alkanediyl, $C_{6-8}$ cycloalkanediyl, $C_{6-14}$ alkanecycloalkanediyl, $C_{5-8}$ heterocycloalkanediyl, and $—[(—CHR^3—)_s—X—]_q—(—CHR^3—)_r—$, wherein, s is an integer from 2 to 6;

q is an integer from 1 to 5;

r is an integer from 2 to 10;

each $R^3$ is independently selected from hydrogen and methyl; and each X is independently selected from —O—, —S—, and —NR—, wherein R is selected from hydrogen and methyl;

each $R^2$ is independently selected from $C_{1-10}$ alkanediyl, $C_{6-8}$ cycloalkanediyl, $C_{6-14}$ alkanecycloalkanediyl, and $—[(—CHR^3—)_s—X—]_q—(—CHR^3—)_r—$, wherein s, q, r, $R^3$, and X are as defined for $R^1$;

m is an integer from 0 to 50;

n is an integer from 1 to 60;

p is an integer from 2 to 6;

B represents a core of a z-valent, polyfunctionalizing agent B (—V)$_z$ wherein, z is an integer from 3 to 6; and each V is a moiety comprising a terminal group reactive with a thiol group; and each —V'— is derived from the reaction of —V with a thiol.

14. The prepolymer of claim 1, wherein the isocyanate-terminated urethane-containing adduct comprises an isocyanate-terminated urethane-containing polythioether adduct, an isocyanate-terminated urethane-containing polysulfide adduct, or a combination thereof.

15. The prepolymer of claim 3, wherein each $R^{50}$ comprises the structure of Formula (5):

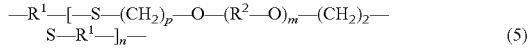  (5)

wherein, each $R^1$ independently is selected from $C_{2-10}$ alkanediyl, $C_{6-8}$ cycloalkanediyl, $C_{6-14}$ alkanecycloalkanediyl, $C_{5-8}$ heterocycloalkanediyl, and $—[(—CHR^3—)_s—X—]_q—(—CHR^3—)_r—$, wherein, s is an integer from 2 to 6;

q is an integer from 1 to 5;

r is an integer from 2 to 10;

each $R^3$ is independently selected from hydrogen and methyl; and each X is independently selected from —O—, —S—, and —NR—, wherein R is selected from hydrogen and methyl;

each $R^2$ is independently selected from $C_{1-10}$ alkanediyl, $C_{6-8}$ cycloalkanediyl, $C_{6-14}$ alkanecycloalkanediyl, and $—[(—CHR^3—)_s—X—]_q—(—CHR^3—)_r—$, wherein s, q, r, $R^3$, and X are as defined as for $R^1$;

m is an integer from 0 to 50;

n is an integer from 1 to 60; and p is an integer from 2 to 6.

16. A composition comprising:

the Michael acceptor-terminated urethane-containing prepolymer of claim 1; and an amine catalyst.

17. The composition of claim 16, comprising a thiol-terminated sulfur-containing adduct.

18. The composition of claim 17, wherein the thiol-terminated sulfur-containing adduct comprises a thiol-terminated polythioether, a thiol-terminated polysulfide, a thiol-terminated sulfur-containing polyformal, or a combination of any of the foregoing.

19. The composition of claim 16, wherein the amine catalyst comprises a controlled-release amine catalyst.

20. The composition of claim 16, formulated as a sealant.

21. A cured sealant, prepared from the composition of claim 20.

* * * * *